US007505527B2

(12) United States Patent
Hwang et al.

(10) Patent No.: US 7,505,527 B2
(45) Date of Patent: Mar. 17, 2009

(54) TRANSMITTING AND RECEIVING APPARATUS FOR SUPPORTING TRANSMIT ANTENNA DIVERSITY USING SPACE-TIME BLOCK CODE

(75) Inventors: Chan-Soo Hwang, Yongin-shi (KR); Vahid Tarokh, Cambridge, MA (US); Seung-Hoon Nam, Seoul (KR); Jae-Hak Chung, Seoul (KR); Yung-Soo Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 697 days.

(21) Appl. No.: 10/681,937

(22) Filed: Oct. 9, 2003

(65) Prior Publication Data

US 2004/0072594 A1 Apr. 15, 2004

Related U.S. Application Data

(60) Provisional application No. 60/417,466, filed on Oct. 10, 2002.

(30) Foreign Application Priority Data

Apr. 4, 2003 (KR) .................. 10-2003-0021364

(51) Int. Cl.
 *H04B 7/02* (2006.01)
(52) U.S. Cl. ................................... 375/267
(58) Field of Classification Search ............. 375/267, 375/299, 347; 455/101, 562.1
 See application file for complete search history.

(56) References Cited

U.S. PATENT DOCUMENTS

| 6,865,237 | B1 * | 3/2005 | Boariu et al. ............... 375/295 |
| 2002/0172293 | A1 * | 11/2002 | Kuchi et al. .................. 375/267 |
| 2003/0174782 | A1 * | 9/2003 | Papadias et al. ............. 375/295 |

FOREIGN PATENT DOCUMENTS

| CN | 1354945 A | 6/2002 |
| WO | WO 99/45657 | 9/1999 |

(Continued)

OTHER PUBLICATIONS

V. Tarokh, H. Jafarkhani, and A. R. Calderbank, "Space-Time Block Codes from Orthogonal Designs", IEEE Trans. Inform. Theory, vol. 45, pp. 1456-1467, Jul. 1999.

(Continued)

*Primary Examiner*—Khai Tran
(74) *Attorney, Agent, or Firm*—The Farrell Law Firm, P.C.

(57) ABSTRACT

A transmitter and a receiver are disclosed herein that support transmit antenna diversity using space-time block coding in a wireless communication system. The transmitter produces symbol combinations containing, as their elements, input symbols, the inversions and conjugates of the symbols, and symbols obtained by rotating the phases of the symbols once, forms a matrix having symbols in at least two columns orthogonal to each other with the symbol combinations, and transmits the matrix. The receiver detects symbols that minimize maximum likelihood (ML) decoding metrics over all possible symbols using channel gains from transmit antennas to a receive antenna. Also, the receiver selects candidate symbols among all possible symbols according to the characteristics of transmitted modulation symbols and detects symbols that minimize the ML decoding metrics.

23 Claims, 15 Drawing Sheets

FOREIGN PATENT DOCUMENTS

WO     WO02080375     10/2002

OTHER PUBLICATIONS

A. Wittneben, "Base Station Modulation Diversity for Digital SIMULCAST", in proc. IEEE'VTC, May 1993, pp. 505-511.

G. G. Raleigh and V. K. Jones, "Multivibrate Modulation and Coding for Wireless Communication", IEEE J. Select. Areas. Commun., vol. 17, pp. 851-866, May 1999.

G. J. Foschini, Jr., "Layered Space-Time Architecture for Wireless Communications in a Fading Environment When Using Multi-element Antennas", Bell Labs Tech. J., pp. 41-59, Autumn 1996.

E. Telatar, "Capacity of Multi-Antenna Gaussian Channels", AT&T-Bell Laboratories, Internal Tech. Memo., Jun. 1995 (28 pp.).

G. J. Foschini, Jr. and M. J. Gans, "On Limits of Wireless Communication in a Fading Environment When Using Multiple Antennas", Wireless Personal Commun., vol. 6, pp. 311-335, 1998.

V. Tarokh, N. Seshadri, and A. R. Calderbank, "Space-Time Codes for High Data Rate Wireless Communications: Performance Criterion and Code Construction", IEEE Trans. Inform. Theory, vol. 44, pp. 744-765, Mar. 1998.

S. M. Alamouti, "A Simple Transmit Diversity Technique for Wireless Communications", IEEE J. Select Areas Commun., vol. 16, pp. 1451-1458, Oct. 1998.

V. Tarokh, A. Naguib, N. Seshadri, and A. R. Calderbanck, "Space-Time Codes for High Data Rate Wireless Communications: Performance Criteria in the Presence of Channel Estimation Errors, Mobility, and Multiple Paths", IEEE Trans. Inform. Theory, vol. 47, pp. 199-207, Feb. 1999.

Giuseppe Caire et al., Bit-Interleaved Coded Modulation; IEEE Transactions on Information Theory, vol. 44, No. 3, pp. 927-946 (1998).

Sharma et al., Improved Quasi-Orthogonal Codes Through Constellation Rotation, May 13, 2002.

Tirkkonan et al., Minimal Non-Orthogonality Rate 1 Space-Time Block Code for 3+ TX Antennas, Sep. 6, 2000.

Tirkkonan et al., Improved Mimo Performance With Non-Orthogonal Space-Time Block Codes, Nov. 25, 2001.

Shao et al., A Rate-One Non-Orthogonal Space-Time Coded OFDM System With Estimation for Frequency Selective Channels, Nov. 17, 2002.

Uysal et al., New Space-Time Block Codes for High Throughput Efficiency, Nov. 25, 2001.

Niida et al., Adaptive Modulation Using Space-Time Block Code Matrix, Feb. 27, 2002.

Tirkkonen, Optimizing Space-Time Block Codes by Constellation Rotations, 2001.

* cited by examiner

TRANSMITTING AND RECEIVING APPARATUS FOR SUPPORTING TRANSMIT ANTENNA DIVERSITY USING SPACE-TIME BLOCK CODE

PRIORITY

This application claims priority under 35 U.S.C. § 120 to an application entitled "Full Rate Space-Time Block Codes For Complex Constellations" filed in the U.S. Patent and Trademark Office on Oct. 10, 2002 and assigned Ser. No. 60/417,466, the contents of which are incorporated herein by reference. This application claims priority under 35 U.S.C. § 119 to an application entitled "Transmitting and Receiving Apparatus for Supporting Transmit Antenna Diversity Using Space-Time Block Code" filed in the Korean Intellectual Property Office on Apr. 4, 2003 and assigned Ser. No. 2003-21364, the contents of which are incorporated herein by reference.

BACKGROUND OF THE INVENTION

1. Field of the Invention

The present invention relates generally to a wireless communication system, and in particular, to a transmitting and receiving apparatus using transmit antenna diversity to combat the degradation effects of fading.

2. Description of the Related Art

One of effective techniques to mitigate fading is transmit diversity in a wireless communication system. Assuming that the channel characteristics of a receiver are known to a transmitter, a switched diversity technique has been proposed (J. H. Winters "Switched Diversity with Feedback for DPSK Mobile Radio System", IEEE Trans. Veh. Technol., vol. 32, pp. 134-150, February 1983) and a multivibrate modulation/coding has also been proposed (G. G. Raleigh and V. K. Jones, "Multivibrate Modulation and Coding for Wireless Communication", IEEE J. Select. Areas. Commun., vol. 17, pp. 851-866, May 1999).

In practice, however, it is nearly impossible for the transmitter to have perfect instantaneous information about the characteristics of the receiver because of mobility and channel changes. Also, the use of feedback channels for reporting channel status information to the transmitter may not be desirable since it reduces channel capacity. Thus, many researchers have focused on the transmit diversity scheme assuming that the transmitter does not know channel information. An initial type of transmit diversity scheme was proposed by Wittneben (A. Wittneben, "Base Station Modulation Diversity for Digital SIMULCAST", in proc. IEEE'VTC, May 1993, pp. 505-511). Foschini studied layered space-time architectures for multiple transmit antenna systems (G. J. Foschini, Jr., "Layered Space-Time Architecture for Wireless Communications in a Fading Environment When Using Multi-element Antennas", Bell Labs Tech. J., pp. 41-59, Autumn 1996). In the presence of Gaussian Noise, Telatar analyzed the capacity of multiple antenna systems (E. Telatar, "Capacity of Multi-Antenna Gaussian Channels", AT&T-Bell Laboratories, Internal Tech. Memo., June 1995). Later, Foschini et. al. derived the expression of outage capacity under the assumption of quasi-static fading (G. J. Foschini, Jr. and M. J. Gans, "On Limits of Wireless Communication in a Fading Environment When Using Multiple Antennas", Wireless Personal Commun., vol. 6, pp. 311-335, 1998).

Recently, space-time coding has received increased attention due to its good performance for high-rate transmissions. Tarokh et. al. introduced space-time trellis coding that provides both coding gain and diversity gain (V. Tarokh, N. Seshadri, and A. R. Calderbanck, "Space-Time Codes for High Data Rate Wireless Communications: Performance Criterion and Code Construction", IEEE Trans. Inform. Theory, vol. 44, pp. 744-765, March 1998, and V. Tarokh, N. Seshadri, and A. R. Calderbanck, "Space-Time Codes for High Data Rate Wireless Communications: Performance Criteria in the Presence of Channel Estimation Errors, Mobility, and Multiple Paths", IEEE Trans. Inform. Theory, vol. 47, pp. 199-207, February 1999). Particularly, the space-time trellis coding disclosed in the second thesis of Tarokh offers the best possible trade-off between constellation size, data rate, diversity advantage, and trellis complexity.

However, according to the above space-time coding techniques, the decoding complexity increases exponentially with transmission rate when the number of transmit antennas is fixed. Therefore, they are not feasible for a large of transmit antennas and at a high bandwidth efficiency.

To overcome this problem, Alamouti and Tarokh proposed space-time block coding (S. M. Alamouti, "A Simple Transmit Diversity Technique for Wireless Communications", IEEE J. Select Areas Commun., vol. 16, pp. 1451-1458, October 1998 and V. Tarokh, H. Jafarkhani, and A. R. Calderbandk, "Space-Time Block Codes from Orthogonal Designs", IEEE Trans. Inform. Theory, vol. 45, pp. 1456-1467, July 1999). These space-time block codes introduce temporal/spatial correlation into signals transmitted from different transmit antennas, so as to provide diversity gain at the receiver and coding gain over an uncoded system. Despite the advantage of simple transmission/reception, these codes cannot achieve all possible diversity gains without data rate losses when complex symbols are transmitted through 3 or more antennas, due to the orthogonality condition for the columns of a transmission matrix.

FIG. 1 is a block diagram of a transmitter using conventional space-time block coding. Referring to FIG. 1, the transmitter is comprised of a serial-to-parallel (S/P) converter 10, an encoder 20, and N transmit antennas 30-1 to 30-N. The S/P converter 10 groups every N symbols received from an information source (not shown) into a block. The encoder 20 generates a predetermined number of symbol combinations from the N symbols and feeds them to the N transmit antennas 30-1 to 30-N for corresponding time periods.

FIG. 2 is a block diagram of a receiver that receives signals from the transmitter illustrated in FIG. 1. Referring to FIG. 2, the receiver is comprised of M receive antennas 40-1 to 40-M, a channel estimator 50, a multi-channel symbol arranger 60, and a decoder 70. The channel estimator 50 estimates channel coefficients representing channel gains from the transmit antennas 30-1 to 30-N to the receive antennas 40-1 to 40-M. The multi-channel symbol arranger 60 collects symbols received from the receive antennas 40-1 to 40-M. The decoder 70 achieves a desired result by multiplying the symbols received from the multi-channel symbol arranger 60 by the channel coefficients, computes decision statistic for all possible symbols using the result, and detects desired symbols through threshold detection.

In a communication system configured as illustrated in FIGS. 1 and 2, let $c_{i,t}$ be the symbol transmitted from transmit antenna i at time t and $a_{i,j}$ be the channel gain from transmit antenna i to receive antenna j. Then the signal $r_{t,j}$ received at receive antenna j at time t is given by equation (1):

$$r_{t,j} = \sum_{k=1}^{K}\sum_{i=1}^{N} a_{i,j} c_{i,t} + n_{t,j} \tag{1}$$

where k is a time index within each time period and $n_{t,j}$ is the noise for the channel between transmit antennas and receive antenna j at time t.

Assuming signals transmitted from different transmit antennas undergo independent Rayleigh fades, the channel gains $a_{t,j}$ are modeled as samples of independent complex Gaussian random variables with zero mean and variance of 0.5 per dimension and the noise values $n_{t,j}$ are modeled as samples of independent complex Gaussian random variables with zero mean and variance of $N_o/2$ per dimension, where $N_o$ is the noise spectral density.

An optimum space-time block code is designed so as to maximize the minimum coding gain of an error matrix. The error matrix refers to a matrix of the differences between original symbols and erroneous symbols arranged in the receiver, and the minimum coding gain is the product of the eigen values of the error matrix.

For illustration, it is assumed that there are 2 transmit antennas and M receive antennas. The transmitter maps b input bits to one of $2^b$ complex symbols using a signal constellation with $2^b$ elements. At a first time period, 2b bits arrive at the encoder and constellation symbols $s_1$ and $s_2$ are picked up. The two symbols are formed with these constellation symbols and transmitted through the 2 transmit antennas for two time periods. The 2×2 transmission matrix is then shown in equation (2):

$$S = \begin{pmatrix} s_1 & s_2 \\ -s_2^* & s_1^* \end{pmatrix} \tag{2}$$

where $s_i^*$ denotes the conjugate of $s_i$.

More specifically, the rows in the transmission matrix indicate symbols transmitted at the same time and the columns indicate symbols transmitted from the same antenna. Thus, $s_1$ is transmitted from the first transmit antenna and $s_2$ from the second transmit antenna at time t, and $-s_2^*$ is transmitted from the first antenna and $s_1^*$ from the second antenna at time t+1. This is the so-called Alamouti scheme and is an example of space-time block code.

Maximum likelihood (ML) decoding of the above space-time block code amounts to minimization of the decision metric of equation (3):

$$\sum_{m=1}^{M} (|r_{1,m} - a_{1,m}s_1 - a_{2,m}s_2|^2 + |a_{1,m}s_2^* - a_{2,m}s_1^*|^2) \tag{3}$$

over all possible symbol pairs of $s_1$ and $s_2$. It can be shown that the above metric decomposes into two parts, shown as equation (4), one of which $$-\sum_{m=1}^{M}[r_{1,m}a_{1,m}^*s_1^* + r_{1,m}^*a_{1,m}s_1 + r_{2,m}a_{2,m}^*s_1 + r_{2,m}^*a_{2,m}s_1^*] +$$

-continued $$|s_1|^2 \sum_{m=1}^{M}\sum_{n=1}^{2}|a_{n,m}|^2$$

is only a function of $s_1$. And the other one $$-\sum_{m=1}^{M}[r_{1,m}a_{2,m}^*s_2^* + r_{1,m}^*a_{2,m}s_2 - r_{2,m}a_{1,m}^*s_2 - r_{2,m}^*a_{1,m}s_2^*] + \tag{4}$$

$$|s_2|^2 \sum_{m=1}^{M}\sum_{n=1}^{2}|a_{n,m}|^2$$

is only a function of $s_2$. Minimizing Eq. (3) is equivalent to minimizing the two metric parts in Eq. (4) because the two metric parts are independent of each other. Thus, the decoder design is simplified by decoding $s_1$ and $s_2$ respectively with the minimized two metric parts.

Eliminating non-symbol related parts from the metric parts, the ML decoding is equivalent to minimizing the metrics of equation (5):

$$\left|\left[\sum_{m=1}^{M}(r_{1,m}a_{1,m}^* + r_{2,m}^*a_{2,m})\right] - s_1\right|^2 + \left(-1 + \sum_{m=1}^{M}\sum_{n=1}^{2}|a_{n,m}|^2\right)|s_1|^2$$

for decoding $s_1$ and $$\left|\left[\sum_{m=1}^{M}(r_{1,m}a_{2,m}^* + r_{2,m}^*a_{1,m})\right] - s_2\right|^2 + \left(-1 + \sum_{m=1}^{M}\sum_{n=1}^{2}|a_{n,m}|^2\right)|s_2|^2 \tag{5}$$

for decoding $s_2$.

Thus, it is observed that space-time block coding can be implemented using a very simple coding/decoding algorithm and can also achieve 1 spatial diversity 2M, where M is the number of receive antennas. For this reason, it has been adapted by various international standardization bodies including WCDMA (Wide-band Code Division Multiple Access) and IS (International Standard)-136.

To achieve the remarkable properties of the space-time block coding, the columns of the transmission matrix must be orthogonal to each other. The above space-time block coding scheme provides a diversity order equal to the number of transmit antennas without loss in transmission rate (i.e., maximum diversity order) even if complex symbols are transmitted from 2 transmit antennas. To generalize the above scheme to more than 2 transmit antennas, a space-time block code in the form of a matrix of orthogonal columns provides a maximum diversity order. Examples of these codes are shown in equation (6):

$$\begin{pmatrix} s_1 & s_2 & s_3 \\ -s_2^* & s_1^* & 0 \\ s_3^* & 0 & -s_1^* \\ 0 & s_3^* & -s_2^* \end{pmatrix} \begin{pmatrix} s_1 & s_2 & s_3 & 0 \\ -s_2^* & s_1^* & 0 & s_3 \\ s_3^* & 0 & -s_1^* & s_2 \\ 0 & s_3^* & -s_2^* & -s_1 \end{pmatrix} \tag{6}$$

The space-time block coding techniques including the Tarokh scheme using these transmission matrixes only reduces the transmission rate of one symbol per channel in use to the transmission of 0.5 or 0.75 symbol per channel use, for more than 2 transmit antennas. This problem makes them less attractive for real wireless applications.

SUMMARY OF THE INVENTION

It is, therefore, an object of the present invention to provide a transmit diversity apparatus that provides a maximum transmission rate and a maximum diversity gain in a communication system using 3 or more transmit antennas.

It is another object of the present invention to provide a transmit diversity apparatus that provides a maximum diversity gain with a very simple encoding and decoding structure in a communication system having using 3 or more transmit antennas.

It is a further object of the present invention to provide a transmit diversity apparatus that provides a maximum diversity gain in a communication system transmitting complex symbols through 3 or more transmit antennas.

The above objects are achieved by a transmitter and a receiver that support transmit antenna diversity using space-time block coding in a wireless communication system. The transmitter produces symbol combinations containing, as their elements, input symbols, the inversions and conjugates of the symbols, and symbols obtained by rotating the phases of the symbols once, forms a matrix having symbols in at least two columns orthogonal to each other with the symbol combinations, and transmits the matrix. According to one aspect of the present invention, the receiver detects symbols that minimize ML decoding metrics over all possible symbols using channel gains from transmit antennas to a receive antenna. According to another aspect of the present invention, the receiver selects candidate symbols among all possible symbols according to the characteristics of transmitted modulation symbols and detects symbols that minimize the ML decoding metrics.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
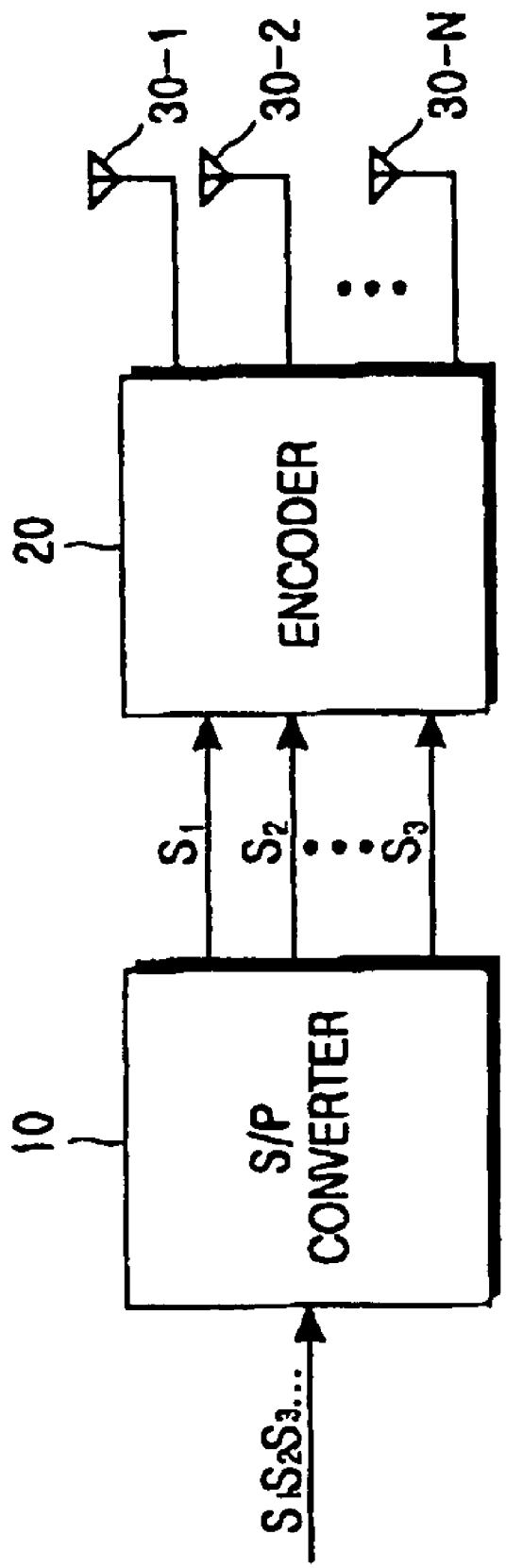
FIG. 1 is a block diagram of a transmitter using conventional space-time block coding.
Figure 2:
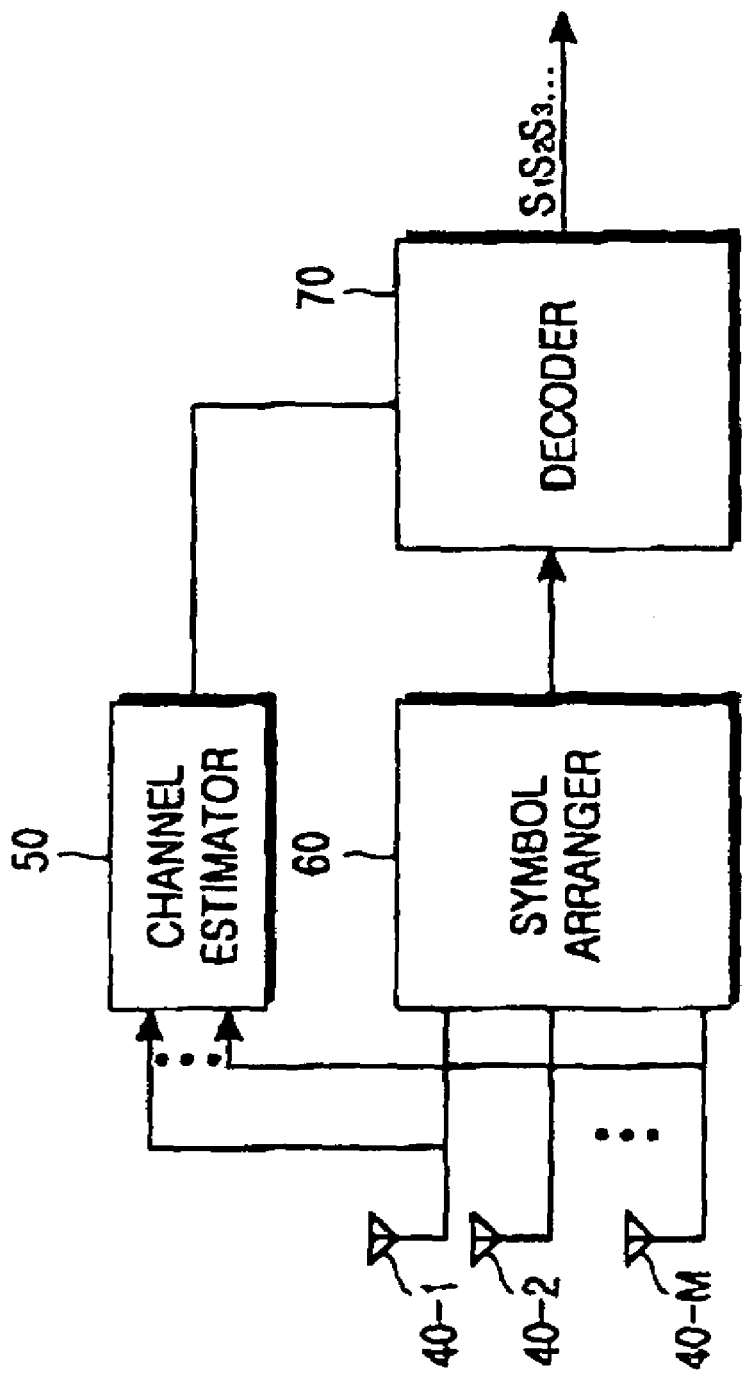
FIG. 2 is a block diagram of a receiver that receives signals from the transmitter illustrated in FIG. 1.

Preferred embodiments of the present invention will be described herein below with reference to the accompanying drawings. In the following description, well-known functions or constructions are not described in detail since they would obscure the invention with unnecessary detail.

The present invention is meant to provide a simple encoding and decoding structure that leads to a transmission matrix whose at least 2 columns are orthogonal to each other and provides a maximum diversity gain in a communication system adopting space-time block coding for 3 or more transmit antennas.

Transmission: Encoding

A transmitter generates a predetermined number of symbol combinations from another predetermined number of input symbols and forms a matrix with one symbol combination in each cell of the matrix. The transmission matrix varies according to a modulation scheme and the number of transmit antennas. Symbols in row (t) are transmitted at time (t) and symbols in column (n) are transmitted through antenna (n).

Transmission matrices are formed for transmission of BPSK, QPSK, 8PSK, 16QAM, or 64QAM codes through 3 or 4 transmit antennas.

The symbol combinations have orthogonal symbols (s) in at least 2 rows, and the inversions (−s) and conjugates (s*) of the symbols as their elements. For illustration, the transmitter forms a 4×4 matrix out of four symbols for four transmit antennas and transmits them at four times. The 4×4 matrix is built by use of four 2×2 matrices such as equation (7):

$$\begin{bmatrix} A & B \\ C & D \end{bmatrix} \tag{7}$$

These 2×2 matrices are constituted in the Alamouti scheme. The number of all possible 4×4 matrices that can be formed in this manner is 24, part of which are shown in equation (8):

$$\begin{bmatrix} s_1 & s_2 & s_3^* & s_4^* \\ s_2^* & -s_1^* & s_4 & -s_3 \\ s_3 & s_4 & -s_1^* & -s_2^* \\ s_4^* & -s_3^* & -s_2 & s_1 \end{bmatrix} \begin{bmatrix} s_1 & s_2 & s_3^* & -s_4^* \\ s_2^* & -s_1^* & s_4 & s_3 \\ s_3 & s_4 & -s_1^* & s_2^* \\ s_4^* & -s_3^* & -s_2 & -s_1 \end{bmatrix} \begin{bmatrix} s_1 & s_2 & s_3^* & -s_4^* \\ s_2^* & -s_1^* & -s_4 & -s_3 \\ s_3 & s_4 & -s_1^* & s_2^* \\ s_4^* & -s_3^* & s_2 & s_1 \end{bmatrix} \quad (8)$$

$$\begin{bmatrix} s_1 & s_2 & s_3^* & s_4^* \\ s_2^* & -s_1^* & -s_4 & s_3 \\ s_3 & s_4 & -s_1^* & -s_2^* \\ s_4^* & -s_3^* & s_2 & s_1 \end{bmatrix} \begin{bmatrix} s_1 & s_2 & -s_3^* & -s_4^* \\ s_2^* & -s_1^* & s_4 & -s_3 \\ s_3 & s_4 & s_1^* & s_2^* \\ s_4^* & -s_3^* & -s_2 & s_1 \end{bmatrix} \begin{bmatrix} s_1 & s_2 & -s_3^* & s_4^* \\ s_2^* & -s_1^* & s_4 & s_3 \\ s_3 & s_4 & s_1^* & -s_2^* \\ s_4^* & -s_3^* & -s_2 & -s_1 \end{bmatrix}$$

$$\begin{bmatrix} s_1 & s_2 & -s_3^* & -s_4^* \\ s_2^* & -s_1^* & -s_4 & s_3 \\ s_3 & s_4 & s_1^* & s_2^* \\ s_4^* & -s_3^* & s_2 & -s_1 \end{bmatrix} \begin{bmatrix} s_1 & s_2 & -s_3^* & s_4^* \\ s_2^* & -s_1^* & -s_4 & -s_3 \\ s_3 & s_4 & s_1^* & -s_2^* \\ s_4^* & -s_3^* & s_2 & s_1 \end{bmatrix}$$

where $s_1$, $s_2$, $s_3$ and $s_4$ are four input symbols.

Some of the arranged symbols are rotated by a predetermined phase prior to transmission. The phase is determined by the minimum coding gain of error matrices so as to maximize diversity gain. An error matrix refers to a matrix having the differences between original symbols and erroneous symbols received at the receiver, and the minimum coding gain is the product of all eigen values of the error matrix.

The phase rotation is implemented once to each of three or four input symbols so that orthogonality is still maintained between the columns of each Alamouti 2×2 matrix. There are 16 phase rotations that satisfy this condition. All possible phase-rotated ones of the first matrix in Eq. (8) are shown in equation (9):

$$\begin{bmatrix} s_1 & s_2 & vs_3^* & vs_4^* \\ s_2^* & -s_1^* & s_4 & -s_3 \\ s_3 & s_4 & -s_1^* & -s_2^* \\ s_4^* & -s_3^* & -vs_2 & vs_1 \end{bmatrix} \begin{bmatrix} s_1 & s_2 & s_3^* & s_4^* \\ s_2^* & -s_1^* & vs_4 & -vs_3 \\ s_3 & s_4 & -vs_1^* & -vs_2^* \\ s_4^* & -s_3^* & -s_2 & s_1 \end{bmatrix} \begin{bmatrix} s_1 & s_2 & vs_3^* & vs_4^* \\ s_2^* & -s_1^* & s_4 & -s_3 \\ s_3 & s_4 & -s_1^* & -s_2^* \\ s_4^* & -s_3^* & -vs_2 & vs_1 \end{bmatrix} \quad (9)$$

$$\begin{bmatrix} s_1 & s_2 & s_3^* & s_4^* \\ s_2^* & -s_1^* & vs_4 & -vs_3 \\ s_3 & s_4 & -s_1^* & -s_2^* \\ s_4^* & -s_3^* & -vs_2 & vs_1 \end{bmatrix} \begin{bmatrix} vs_1 & vs_2 & s_3^* & s_4^* \\ s_2^* & -s_1^* & s_4 & -s_3 \\ vs_3 & vs_4 & -s_1^* & -s_2^* \\ s_4^* & -s_3^* & -s_2 & s_1 \end{bmatrix} \begin{bmatrix} vs_1 & vs_2 & s_3^* & s_4^* \\ s_2^* & -s_1^* & s_4 & -s_3 \\ s_3 & s_4 & -s_1^* & -s_2^* \\ vs_4^* & -vs_3^* & -s_2 & s_1 \end{bmatrix}$$

$$\begin{bmatrix} s_1 & s_2 & s_3^* & s_4^* \\ vs_2^* & -vs_1^* & s_4 & -s_3 \\ vs_3 & vs_4 & -s_1^* & -s_2^* \\ s_4^* & -s_3^* & -s_2 & s_1 \end{bmatrix} \begin{bmatrix} s_1 & s_2 & s_3^* & s_4^* \\ vs_2^* & -vs_1^* & s_4 & -s_3 \\ s_3 & s_4 & -s_1^* & -s_2^* \\ vs_4^* & -vs_3^* & -s_2 & s_1 \end{bmatrix} \begin{bmatrix} vs_1 & vs_2 & vs_3^* & vs_4^* \\ s_2^* & -s_1^* & s_4 & -s_3 \\ s_3 & s_4 & -s_1^* & -s_2^* \\ s_4^* & -s_3^* & -s_2 & s_1 \end{bmatrix}$$

$$\begin{bmatrix} vs_1 & vs_2 & s_3^* & s_4^* \\ s_2^* & -s_1^* & vs_4 & -vs_3 \\ s_3 & s_4 & -s_1^* & -s_2^* \\ s_4^* & -s_3^* & -s_2 & s_1 \end{bmatrix} \begin{bmatrix} s_1 & s_2 & vs_3^* & vs_4^* \\ vs_2^* & -vs_1^* & s_4 & -s_3 \\ s_3 & s_4 & -s_1^* & -s_2^* \\ s_4^* & -s_3^* & -s_2 & s_1 \end{bmatrix}$$

$$\begin{bmatrix} s_1 & s_2 & s_3^* & s_4^* \\ vs_2^* & -vs_1^* & vs_4 & -vs_3 \\ s_3 & s_4 & -s_1^* & -s_2^* \\ s_4^* & -s_3^* & -s_2 & s_1 \end{bmatrix} \begin{bmatrix} s_1 & s_2 & s_3^* & s_4^* \\ s_2^* & -s_1^* & s_4 & -s_3 \\ vs_3 & vs_4 & -vs_1^* & -vs_2^* \\ s_4^* & -s_3^* & -s_2 & s_1 \end{bmatrix}$$

-continued $$\begin{bmatrix} s_1 & s_2 & s_3^* & s_4^* \\ s_2^* & -s_1^* & s_4 & -s_3 \\ s_3 & s_4 & -vs_1^* & -vs_2^* \\ vs_4^* & -vs_3^* & -s_2 & s_1 \end{bmatrix} \begin{bmatrix} s_1 & s_2 & s_3^* & s_4^* \\ s_2^* & -s_1^* & s_4 & -s_3 \\ vs_3 & vs_4 & -s_1^* & -s_2^* \\ s_4^* & -s_3^* & -vs_2 & vs_1 \end{bmatrix}$$

$$\begin{bmatrix} s_1 & s_2 & s_3^* & s_4^* \\ s_2^* & -s_1^* & s_4 & -s_3 \\ s_3 & s_4 & -s_1^* & -s_2^* \\ vs_4^* & -vs_3^* & -vs_2 & vs_1 \end{bmatrix}$$

As noted from the above matrices, the four input symbols $s_1$, $s_2$, $s_3$ and $s_4$ each rotate one time by a predetermined phase value "v". The phase-rotated matrices are referred to as transmission coding matrices. A total of 384(=24×16)4×4n transmission coding matrices can be produced according to the present invention.

Figure 3:
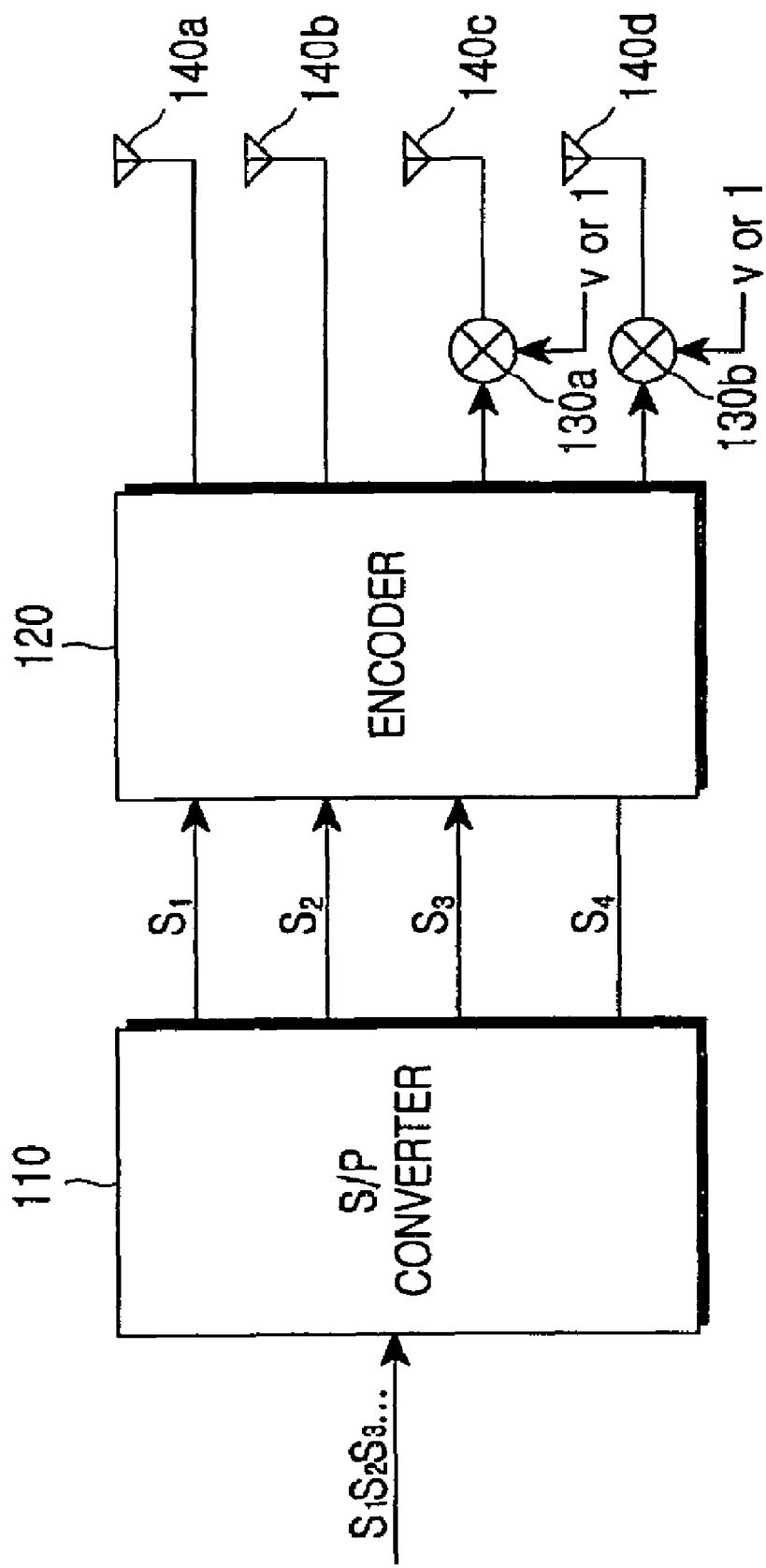
FIG. 3 is a block diagram of a transmitter that transmits symbols through 4 transmit antennas according to an embodiment of the present invention.

FIG. 3 is a block diagram of a transmitter for transmitting one of the transmission coding matrices in the first row of Eq. (9) through four transmit antennas according to an embodiment of the present invention.

Referring to FIG. 3, the transmitter includes an S/P converter 110, an encoder 120, phase rotators 130a and 130b, and four transmit antennas 140a to 140d. The S/P converter 110 feeds four input symbols $s_1$, $s_2$, $s_3$ and $s_4$ in one block to the encoder 120. The encoder 120 produces the first matrix of Eq. (8) from the received one-block symbols. Specifically, the encoder 120 generates four combinations each having four symbol elements from the input four symbols and outputs them one by one at four times. The four symbol combinations correspond to the four rows of the matrix and the plurality of symbols are transmitted once through their respective antennas at their respective times.

The phase rotators 130a and 130b rotate the phases of two of the four rows received from the encoder 120 by v. When the first transmission coding matrix in Eq. (9) is used, the phase rotators 130a and 130b rotate input symbols by v for transmission at first and fourth times, bypassing symbols for transmission at the other times. The resulting symbols are transmitted to a receiver through the transmit antennas 140a to 140d.

The encoder 120 and the phase rotators 130a and 130b collectively function as a transmission coding matrix generator. While only two rotators 130a and 130b are shown, more rotators can be connected between the encoder 120 and corresponding transmit antennas if other transmission coding matrices are adopted.

A 4×3 transmission coding matrix for three transmit antennas is generated from a 4×4 transmission coding matrix by selecting two of the four columns of the 4×4 matrix, linearly combining the elements of the selected columns, and replacing the selected columns by a column of the linear elements. Six ways ($_4C_2$) can be used to select two of the four columns. For example, 4×3 transmission coding matrices derived from the first matrix of Eq. (8) are shown as equation (10):

$$\begin{bmatrix} \frac{(s_1+s_2)}{\sqrt{2}} & s_3^* & s_4^* \\ \frac{(s_2^*-s_1^*)}{\sqrt{2}} & s_4 & -s_3 \\ \frac{(s_3+s_4)}{\sqrt{2}} & -s_1^* & -s_2^* \\ \frac{(s_4^*-s_3^*)}{\sqrt{2}} & -s_2 & s_1 \end{bmatrix} \begin{bmatrix} s_1 & \frac{(s_2+s_3^*)}{\sqrt{2}} & s_4^* \\ s_2^* & \frac{(-s_1^*+s_4)}{\sqrt{2}} & -s_3 \\ s_3 & \frac{(s_4-s_1^*)}{\sqrt{2}} & -s_2^* \\ s_4^* & \frac{(-s_3^*-s_2)}{\sqrt{2}} & s_1 \end{bmatrix} \begin{bmatrix} s_1 & s_2 & \frac{(s_3^*+s_4^*)}{\sqrt{2}} \\ s_2^* & -s_1^* & \frac{(s_4-s_3)}{\sqrt{2}} \\ s_3 & s_4 & \frac{(-s_1^*-s_2^*)}{\sqrt{2}} \\ s_4^* & -s_3^* & \frac{(s_1-s_2)}{\sqrt{2}} \end{bmatrix} \quad (10)$$

$$\begin{bmatrix} \frac{(s_1+s_3^*)}{\sqrt{2}} & s_2 & s_4^* \\ \frac{(s_2^*-s_4)}{\sqrt{2}} & -s_1^* & -s_3 \\ \frac{(s_3-s_1^*)}{\sqrt{2}} & s_4 & -s_2^* \\ \frac{(s_4^*-s_2)}{\sqrt{2}} & -s_3^* & s_1 \end{bmatrix} \begin{bmatrix} s_1 & \frac{(s_2+s_4^*)}{\sqrt{2}} & s_3^* \\ s_2^* & \frac{(-s_1^*-s_3)}{\sqrt{2}} & s_4 \\ s_3 & \frac{(s_4-s_2^*)}{\sqrt{2}} & -s_1^* \\ s_4^* & \frac{(-s_3^*+s_1)}{\sqrt{2}} & s_2 \end{bmatrix} \begin{bmatrix} s_2 & s_3 & \frac{(s_1+s_4^*)}{\sqrt{2}} \\ -s_1^* & s_4 & \frac{(s_2^*-s_3)}{\sqrt{2}} \\ s_4 & -s_1^* & \frac{(s_3-s_2^*)}{\sqrt{2}} \\ -s_3^* & -s_2 & \frac{(s_4^*+s_1)}{\sqrt{2}} \end{bmatrix}$$

Similarly, the above matrices are phase-rotated. Thus, a total of 1728 4×3 transmission coding matrices are possible.

Figure 4:
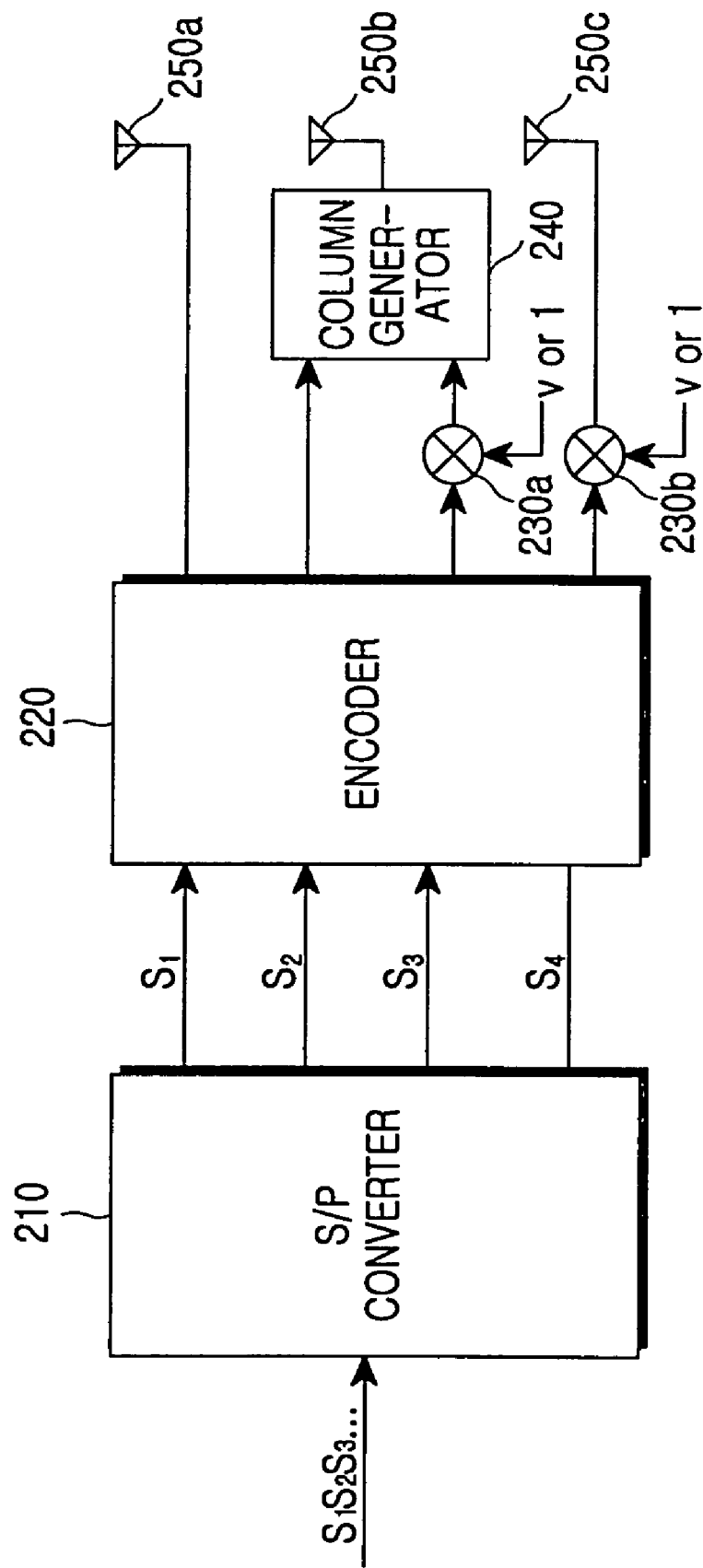
FIG. 4 is a block diagram of a transmitter that transmits symbols through 3 transmit antennas according to another embodiment of the present invention.

FIG. 4 is a block diagram of a transmitter for transmitting code symbols in a 4×3 transmission coding matrix produced from the first transmission coding matrix of Eq. (9) according to another embodiment of the present invention.

Referring to FIG. 4, the transmitter includes an S/P converter 210, an encoder 220, rotators 230a and 230b, a column generator 240, and three transmit antennas 250a, 250b and 250c. The S/P converter 210 feeds four input symbols $s_1$, $s_2$, $s_3$ and $s_4$ in one block to the encoder 220. The encoder 220 produces the first matrix of Eq. (8) from the received one-block symbols. Specifically, the encoder 220 generates four combinations each having four symbol elements from the input four symbols and outputs them one by one over four time periods. The four symbol combinations correspond to the four rows of the matrix and the plurality of symbols are transmitted once through their respective antennas at their respective time periods.

The phase rotators 230a and 230b rotate the phases of two of the four rows received from the encoder 220 by v. When the first transmission coding matrix in Eq. (9) is used, the phase rotators 130a and 130b rotate input symbols by v for transmission at first and fourth times, bypassing symbols for transmission at the other times.

The column generator 240 linearly combines the symbol of the second column with the symbol received from the phase rotator 230a at each transmission time and outputs the combined symbol to the transmit antenna 250b. The outputs of the encoder 230, the column generator 240, and the phase rotator 230b are transmitted to the receiver through the transmit antennas 250a, 250b and 250c.

The encoder 220, the phase rotators 230a and 230b, and the column generator 240 collectively function as a transmission coding matrix generator. While only two rotators 230a and 230b are shown and the column generator 240 combines the symbols of the second and third columns, more rotators can be connected between the encoder 220 and corresponding transmit antennas and the column generator 240 can be disposed at a different corresponding position if other transmission coding matrices are adopted.

Examples of desirable transmission coding matrices for three and four transmit antennas are illustrated below.

With respect to a BPSK constellation, the transmission matrix is given in equation (11) by $$U_1 = \begin{pmatrix} s_1 & \frac{s_2+js_3}{\sqrt{2}} & s_4 \\ -s_2^* & \frac{s_1^*-js_4^*}{\sqrt{2}} & s_3^* \\ -s_4^* & \frac{-s_3^*+js_2^*}{\sqrt{2}} & s_1^* \\ s_3 & \frac{-s_4-js_1}{\sqrt{2}} & s_2 \end{pmatrix}$$

for three transmit antennas. For four transmit antennas, the transmission matrix is $$U_2 = \begin{pmatrix} s_1 & s_2 & js_3 & s_4 \\ -s_2^* & s_1^* & -js_4^* & s_3^* \\ -s_4^* & -s_3^* & js_2^* & s_1^* \\ s_3 & -s_4 & -js_1 & s_2 \end{pmatrix} \quad (11)$$

With respect to a QPSK constellation, the transmission matrix for three antennas is given in equation (12) by $$U_3 = \begin{pmatrix} s_1 & \frac{s_2+s_3}{\sqrt{2}} & s_4 \\ -s_2^* & \frac{s_1^*-vs_4^*}{\sqrt{2}} & vs_3^* \\ -s_4^* & \frac{-s_3^*+s_2^*}{\sqrt{2}} & s_1^* \\ s_3 & \frac{-s_4-vs_1}{\sqrt{2}} & vs_2 \end{pmatrix}$$

where $v=e^{-j2\pi/3}$ for example. For four transmit antennas, the transmission matrix is $$U_4 = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix} \quad (12)$$

where $v=e^{-j2\pi/3}$ for example.

With respect to an 8PSK constellation, the transmission matrix for three antennas is given in equation (13) by $$U_5 = \begin{pmatrix} s_1 & \frac{s_2+s_3}{\sqrt{2}} & s_4 \\ -s_2^* & \frac{s_1^*-vs_4^*}{\sqrt{2}} & vs_3^* \\ -s_4^* & \frac{-s_3^*+s_2^*}{\sqrt{2}} & s_1^* \\ s_3 & \frac{-s_4-vs_1}{\sqrt{2}} & vs_2 \end{pmatrix}$$

where $v=e^{-j5\pi/6}$ for example. For four transmit antennas, the transmission matrix is $$U_6 = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix} \quad (13)$$

where $v=e^{-j5\pi/6}$ for example,

With respect to an 16QAM constellation, the transmission matrix for three antennas is given in equation (14) by $$U_7 = \begin{pmatrix} s_1 & \frac{s_2+s_3}{\sqrt{2}} & s_4 \\ -s_2^* & \frac{s_1^*-vs_4^*}{\sqrt{2}} & vs_3^* \\ -s_4^* & \frac{-s_3^*+s_2^*}{\sqrt{2}} & s_1^* \\ s_3 & \frac{-s_4-vs_1}{\sqrt{2}} & vs_2 \end{pmatrix}$$

where $v=e^{-j5\pi/12}$ for example. For four transmit antennas, the transmission matrix is $$U_8 = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix} \quad (14)$$

where $v=e^{-j5\pi/12}$ for example.

With respect to an 64QAM constellation, the transmission matrix for three antennas is given in equation (15) by $$U_9 = \begin{pmatrix} s_1 & \frac{s_2+s_3}{\sqrt{2}} & s_4 \\ -s_2^* & \frac{s_1^*-vs_4^*}{\sqrt{2}} & vs_3^* \\ -s_4^* & \frac{-s_3^*+s_2^*}{\sqrt{2}} & s_1^* \\ s_3 & \frac{-s_4-vs_1}{\sqrt{2}} & vs_2 \end{pmatrix}$$

where $v=e^{-j7\pi/48}$ for example. For four transmit antennas, the transmission matrix is $$U_{10} = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix} \quad (15)$$

where $v=e^{-j7\pi/48}$ for example.

Also in accordance with the present invention, described below is a receiver that can decode symbols of the above transmission coding matrices by ML decoding (first embodiment), by super-fast decoding (second embodiment) that renders the ML decoding more efficient, or by sub-optimal decoding (third embodiment).

Decoding According to the First Embodiment

Figure 5:
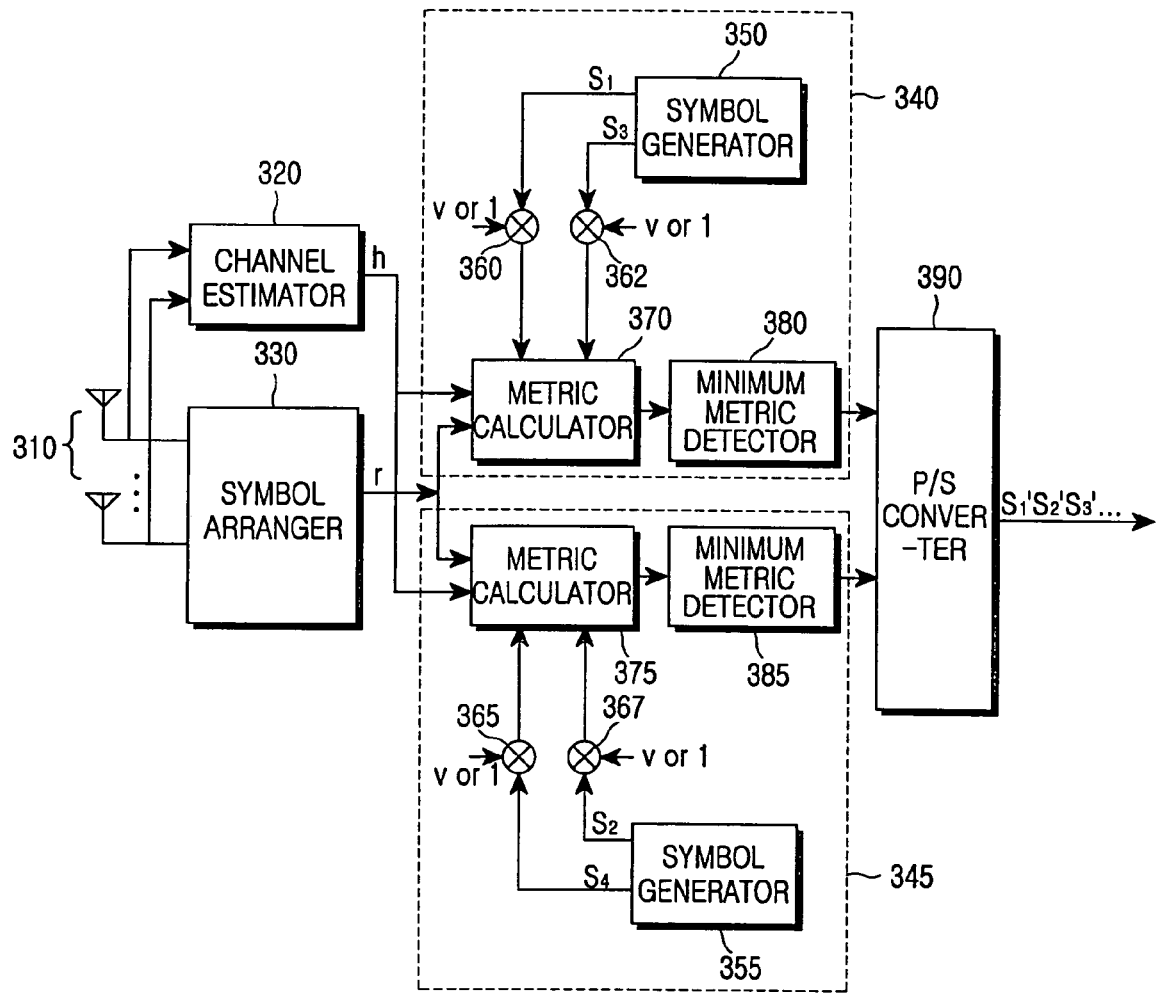
FIG. 5 is a block diagram of a receiver for performing decoding pursuant to an embodiment of the present invention.

FIG. 5 is a block diagram of a receiver that decodes according to an embodiment of the present invention. The receiver is comprised of two independent decoders 340 and 345.

Referring to FIG. 5, a channel estimator 320 estimates channel coefficients representing channel gains from a plurality of transmit antennas to a plurality of receive antennas 310. A symbol arranger 330 collects symbols received from the receive antennas 310 for the four time periods corresponding to transmission by the transmitter illustrated in FIG. 3 or FIG. 4 of one block of symbols at four times.

The symbol arranger 330 forms a matrix out of the collected symbols. In the matrix, symbols received from the same receive antenna are arranged in the same row and symbols received at the same time are arranged in the same column. Although the plurality of receive antennas 310 are illustrated, decoding for the case of one antenna will be described below, for notational simplicity.

If four symbols to be detected are $x_1$, $x_2$, $x_3$ and $x_4$, the first decoder 340 detects $x_1$ and $x_3$ and the second decoder 345 detects $x_2$ and $x_4$, based on the channel gains and the received symbols. Thus, the decoders 340 and 345 detect the four symbols $x_1$, $x_2$, $x_3$ and $x_4$ simultaneously.

In the first decoder 340, a symbol generator 350 generates all possible symbol pairs and phase rotators 360 and 362 rotate at least one symbol of each symbol pair by the phase value v used in the transmitter or by 1.

A metric calculator 370 calculates the metric values of the resulting phase-rotated symbol pairs. The number of all possible symbol pairs is 2×2 for BPSK, 4×4 for QPSK, 8×8 for 8PSK, 16×16 for 16QAM, and 64×64 for 64QAM. A minimum metric detector 380 detects symbols $x_1$ and $x_3$ that have a minimum metric.

The second decoder 345 operates in the same manner. After the first and second decoders 340 and 345 detect $x_1$ & $x_3$ and $x_2$ & $x_4$, respectively, a parallel-to-serial (P/S) converter 390 arranges the detected symbols in the right order and outputs the recovered symbol combination of $x_1$, $x_2$, $x_3$, and $x_4$.

For notational simplicity, a description will be made below of decoding for BPSK symbols, $U_1$ illustrated in matrix (11) transmitted from three transmit antennas for the case of one receive antenna, with channel gains from the first, second and third transmit antennas to the receiver of $\alpha$, $\beta$ and $\gamma$, respectively. The signal $r_t$, received at the receive antenna at time t is given by equation (16):

$$r_1 = \alpha s_1 + \beta \frac{s_2 + s_3}{\sqrt{2}} + \gamma s_4 + n_1, \quad (16)$$

$$r_2 = -\alpha s_2^* + \beta \frac{s_1^* - j s_4^*}{\sqrt{2}} + \gamma s_3^* + n_2,$$

$$r_3 = -\alpha s_4^* + \beta \frac{-s_3^* + j s_2^*}{\sqrt{2}} + \gamma s_1^* + n_3,$$

$$r_4 = \alpha s_3 + \beta \frac{-s_4 - j s_1}{\sqrt{2}} + \gamma s_2 + n_4,$$

where $s_1$, $s_2$, $s_3$ and $s_4$ are symbols transmitted from the transmitter and $n_1$, $n_2$, $n_3$ and $n_4$ are noise involved with the transmission at the four times. For $U_1$, the receiver computes symbols $x_1$, $x_2$, $x_3$, and $x_4$ that minimize the sum as shown in equation (17):

$$\left| r_1 - \left( \alpha x_1 + \beta \frac{x_2 + x_3}{\sqrt{2}} + \gamma x_4 \right) \right|^2 + \left| r_2 - \left( -\alpha x_2^* + \beta \frac{x_1^* - j x_4^*}{\sqrt{2}} + \gamma x_3^* \right) \right|^2 + \quad (17)$$

$$\left| r_3 - \left( -\alpha x_4^* + \beta \frac{-x_3^* + j x_2^*}{\sqrt{2}} + \gamma x_1^* \right) \right|^2 +$$

$$\left| r_4 - \left( \alpha x_3 + \beta \frac{-x_4 - j x_1}{\sqrt{2}} + \gamma x_2 \right) \right|^2$$

The sum decomposes into two parts. The first part contains only $x_1$ and $x_3$ and the second part contains only $x_2$ and $x_4$. Thus, the receiver illustrated in FIG. 5 is constituted by decoupling the first decoder 340 for decoding the pair of $x_1$ and $x_3$ from the second decoder 345 for decoding the pair of $x_2$ and $x_4$.

The above operation for the transmission coding matrices $U_1$, $U_3$, $U_5$, $U_7$ and $U_9$ transmitted from three transmit antennas will be described in more detail.

For ML decoding for $U_1$, as shown in equation (18), letting $$R_1 = \alpha^* r_1 + \beta \frac{1}{\sqrt{2}} r_2^* + \gamma r_3^* + j \beta^* \frac{1}{\sqrt{2}} r_4 \quad (18)$$

$$R_3 = \gamma r_2^* - j \beta^* \frac{1}{\sqrt{2}} r_1 + \alpha^* r_4 - \beta^* \frac{1}{\sqrt{2}} r_3^*$$

$$R_{13} = \frac{j(C_1 + C_3)}{2}$$

$$C_1 = -\alpha^* \beta \sqrt{2} - \alpha \beta^* \sqrt{2}$$

$$C_3 = j \gamma^* \beta \sqrt{2} - j \gamma \beta^* \sqrt{2}$$

the first decoder 340 minimizes the sum as shown in equation (19):

$$|R_1 - x_1|^2 + |R_3 - x_3|^2 + |R_{13} - x_1^* x_3|^2 \quad (19)$$

over all possible symbol pairs and detects the minimizing symbol pair $x_1$ and $x_3$.

Similarly, as shown in equation (20), letting $$R_2 = \beta^* \frac{1}{\sqrt{2}} r_1 - \alpha r_2^* + j \beta \frac{1}{\sqrt{2}} r_3^* + \gamma^* r_4 \quad (20)$$

-continued $$R_4 = \gamma^* r_1 - j \beta \frac{1}{\sqrt{2}} r_2^* - \alpha r_3^* - \beta^* \frac{1}{\sqrt{2}} r_4$$

$$R_{24} = \frac{j(C_2 + C_4)}{2}$$

$$C_2 = \alpha \beta^* \sqrt{2} + \alpha^* \beta \sqrt{2}$$

$$C_4 = j \gamma \beta^* \sqrt{2} - j \gamma^* \beta \sqrt{2}$$

the second decoder 345 minimizes the sum as shown in equation (21):

$$|R_2 - x_2|^2 + |R_4 - x_4|^2 + |R_{24} - x_2^* x_4|^2 \quad (21)$$

over all the possible symbol pairs and detects the minimizing symbol pair $x_2$ and $x_4$.

For ML decoding for $U_3$ or $U_5$, as shown in equation (22), letting $$R_1 = \alpha^* r_1 + \beta \frac{1}{\sqrt{2}} r_2^* + \gamma r_3^* - \nu^* \beta^* \frac{1}{\sqrt{2}} r_4 \quad (22)$$

$$R_3 = \nu \gamma r_2^* - \beta^* \frac{1}{\sqrt{2}} r_1 + \alpha^* r_4 - \beta \frac{1}{\sqrt{2}} r_3^*$$

$$R_{13} = -\frac{(C_1 + C_3)}{2}$$

$$C_1 = -\alpha^* \beta \nu \sqrt{2} - \alpha \beta^* \sqrt{2}$$

$$C_3 = \gamma \beta^* \nu \sqrt{2} - \gamma^* \beta \sqrt{2}$$

where v is the phase value by which the phase of a symbol is rotated, $e^{-j2\pi/3}$ for $U_3$ and $e^{-j5\pi/6}$ for $U_5$, for example, the first decoder 340 minimizes the sum as shown in equation (23):

$$|R_1 - x_1|^2 + |R_3 - x_3|^2 + |R_{13} - x_1^* x_3|^2 \quad (23)$$

over all possible symbol pairs and detects the minimizing symbol pair $x_1$ and $x_3$.

Similarly, as shown in equation (24), letting $$R_2 = \beta^* \frac{1}{\sqrt{2}} r_1 - \alpha r_2^* + \beta \frac{1}{\sqrt{2}} r_3^* + \nu^* \gamma^* r_4 \quad (24)$$

$$R_4 = \gamma^* r_1 - \nu \beta \frac{1}{\sqrt{2}} r_2^* - \alpha r_3^* - \beta^* \frac{1}{\sqrt{2}} r_4$$

$$R_{24} = -\frac{(C_2 + C_4)}{2}$$

$$C_2 = -\alpha \beta^* \sqrt{2} + \nu \alpha^* \beta \sqrt{2}$$

$$C_4 = -\nu \gamma \beta^* \sqrt{2} + \gamma^* \beta \sqrt{2}$$

the second decoder 345 minimizes the sum as shown in equation (25):

$$|R_2 - x_2|^2 + |R_4 - x_4|^2 + |R_{24} - x_2^* x_4|^2 \quad (25)$$

over all the possible symbol pairs and detects the minimizing symbol pair $x_2$ and $x_4$.

For ML decoding for $U_7$ or $U_9$, as shown in equation (26), letting $$R_1 = \frac{\left(\alpha^* r_1 + \beta \frac{1}{\sqrt{2}} r_2^* + \gamma r_3^* - v^* \beta^* \frac{1}{\sqrt{2}} r_4\right)}{K_3}$$

$$R_3 = \frac{\left(v\gamma r_2^* + \beta^* \frac{1}{\sqrt{2}} r_1 + \alpha^* r_4 - \beta \frac{1}{\sqrt{2}} r_3^*\right)}{K_3}$$

$$R_{13} = -\frac{(C_1 + C_3)}{2K_3}$$

$$K_3 = |\alpha|^2 + |\beta|^2 + |\gamma|^2$$

$$C_1 = -\alpha^*\beta v \sqrt{2} + \alpha\beta^* \sqrt{2}$$

$$C_3 = \gamma\beta^* v \sqrt{2} - \gamma^*\beta \sqrt{2} \tag{26}$$

where $v = e^{-j5\pi/12}$ for $U_7$ and $v = e^{-j7\pi/48}$ for $U_9$, for example, the first decoder 340 minimizes the sum as shown in equation (27):

$$|R_1-x_1|^2 + |R_3-x_3|^2 + |R_{13}-x^*_1 x_3|^2 - |x_1|^2|x_3|^2 \tag{27}$$

over all possible symbol pairs and detects the minimizing symbol pair $x_1$ and $x_3$.

Similarly, as shown in equation (28), letting $$R_2 = \frac{\left(\beta^* \frac{1}{\sqrt{2}} r_1 - \alpha r_2^* + \beta \frac{1}{\sqrt{2}} r_3^* + v^*\gamma^* r_4\right)}{K_3}$$

$$R_4 = \frac{\left(\gamma^* r_1 - v\beta \frac{1}{\sqrt{2}} r_2^* - \alpha r_3^* - \beta^* \frac{1}{\sqrt{2}} r_4\right)}{K_3}$$

$$R_{24} = -\frac{(C_2 + C_4)}{2K_3}$$

$$C_2 = -\alpha\beta^* \sqrt{2} + v\alpha^*\beta\sqrt{2}$$

$$C_4 = -v\gamma\beta^* \sqrt{2} + \gamma^*\beta\sqrt{2} \tag{28}$$

the second decoder 345 minimizes the sum as shown in equation (29):

$$|R_2-x_2|^2 + |R_4-x_4|^2 + |R_{24}-x^*_2 x_4|^2 - |x_2|^2|x_4|^2 \tag{29}$$

over all the possible symbol pairs and detects the minimizing symbol pair $x_2$ and $x_4$.

Now, ML decoding for modulation symbols transmitted from four transmit antennas will be described with reference to one receive antenna, with channel gains from the first to fourth transmit antennas to the receiver of $\alpha$, $\beta$, $\gamma$, and $\xi$, respectively.

For ML decoding for $U_2$, as shown in equation (30), letting $$R_1 = \alpha^* r_1 + \beta r_2^* + \zeta r_3^* + j\gamma^* r_4$$

$$R_3 = \zeta r_2^* - j\gamma^* r_1 + \alpha^* r_4 - \beta r_3^*$$

$$R_{13} = -(C_1 + C_3)$$

$$C_1 = j\alpha^*\gamma + j\alpha\gamma^*$$

$$C_3 = \zeta^*\beta - \zeta\beta^* \tag{30}$$

the first decoder 340 minimizes the sum as shown in equation (31):

$$|R_1-x_1|^2 + |R_3-x_3|^2 + |R_{13}-x_1 x^*_3|^2 \tag{31}$$

over all possible symbol pairs and detects the minimizing symbol pair $x_1$ and $x_3$.

Similarly, as shown in equation (32), letting $$R_2 = \beta^* r_1 - \alpha r_2^* + j\gamma r_3^* + \zeta^* r_4$$

$$R_4 = \zeta^* r_1 - j\gamma r_2^* - \alpha r_3^* - \beta^* r_4$$

$$R_{24} = -(C_2 + C_4)$$

$$C_2 = \zeta\beta^* - \zeta^*\beta$$

$$C_4 = -j\alpha\gamma^* - j\gamma\alpha^* \tag{32}$$

the second decoder 345 minimizes the sum as shown in equation (33):

$$|R_2-x_2|^2 + |R_4-x_4|^2 + |R_{24}-x_2 x^*_4|^2 \tag{33}$$

over all the possible symbol pairs and detects the minimizing symbol pair $x_2$ and $x_4$.

For ML decoding for $U_4$ or $U_6$, as shown in equation (34), letting $$R_1 = \alpha^* r_1 + \beta r_2^* + \zeta r_3^* - v^*\gamma^* r_4$$

$$R_3 = v\zeta r_2^* + \gamma^* r_1 + \alpha^* r_4 - \beta r_3^*$$

$$R_{13} = -(C_1 + C_3)$$

$$C_1 = -\alpha^*\gamma v + \alpha\gamma^*$$

$$C_3 = \zeta\beta^* v - \zeta^*\beta \tag{34}$$

where $v = e^{-j2\pi/3}$ for $U_4$ and $v = e^{-j5\pi/6}$ for $U_6$, for example, the first decoder 340 minimizes the sum as shown in equation (35):

$$|R_1-x_1|^2 + |R_3-x_3|^2 + |R_{13}-x^*_1 x_3|^2 \tag{35}$$

over all possible symbol pairs and detects the minimizing symbol pair $x_1$ and $x_3$.

Similarly, as shown in equation (36), letting $$R_2 = \beta^* r_1 - \alpha r_2^* + \gamma r_3^* + v^*\zeta^* r_4$$

$$R_4 = \zeta^* r_1 - v\gamma r_2^* - \alpha r_3^* - \beta^* r_4$$

$$R_{24} = -(C_2 + C_4)$$

$$C_2 = -\alpha\gamma^* + v\alpha^*\gamma$$

$$C_4 = -v\zeta\beta^* + \zeta^*\beta \tag{36}$$

the second decoder 345 minimizes the sum as shown in equation (37):

$$|R_2-x_2|^2 + |R_4-x_4|^2 + |R_{24}-x^*_2 x_4|^2 \tag{37}$$

over all the possible symbol pairs and detects the minimizing symbol pair $x_2$ and $x_4$.

For ML decoding for $U_8$ or $U_{10}$, as shown in equation (38), letting $$R_1 = \frac{(\alpha^* r_1 + \beta r_2^* + \zeta r_3^* - v^*\gamma^* r_4)}{K_4} \tag{38}$$

-continued $$R_3 = \frac{(v\zeta r_2^* + \gamma^* r_1 + \alpha^* r_4 - \beta r_3^*)}{K_4}$$

$$R_{13} = -\frac{(C_1 + C_3)}{K_4}$$

$$K_4 = |\alpha|^2 + |\beta|^2 + |\gamma|^2$$

$$C_1 = -\alpha^*\gamma v + \alpha\gamma^*$$

$$C_3 = \zeta\beta^* v - \zeta^*\beta$$

where $v=e^{-j5\pi/12}$ for $U_8$ and $v=e^{-j7\pi/48}$ for $U_{10}$, for example, the first decoder 340 minimizes the sum as shown in equation (39):

$$|R_1-x_1|^2+|R_3-x_3|^2+|R_{13}-x^*_1 x_3|^2-|x_1|^2|x_3|^2 \quad (39)$$

over all possible symbol pairs and detects the minimizing symbol pair $x_1$ and $x_3$.

Similarly, as shown in equation (40), letting $$R_2 = \frac{(\beta^* r_1 - \alpha r_2^* + \gamma r_3^* + v^*\zeta^* r_4)}{K_4} \quad (40)$$

$$R_4 = \frac{(\zeta^* r_1 - v\gamma r_2^* - \alpha r_3^* - \beta^* r_4)}{K_4}$$

$$R_{24} = -\frac{(C_2 + C_4)}{K_4}$$

$$C_2 = -\alpha\gamma^* + v\alpha^*\gamma$$

$$C_4 = -v\zeta\beta^* + \zeta^*\beta$$

the second decoder 345 minimizes the sum as shown in equation (41):

$$|R_2-x_2|^2+|R_4-x_4|^2+|R_{24}-x^*_2 x_4|^2-|x_2|^2|x_4|^2 \quad (41)$$

over all the possible symbol pairs and detects the minimizing symbol pair $x_2$ and $x_4$.

Decoding According to the Second Embodiment

For ML decoding according to the first embodiment, the metric values of all possible symbol pairs must be computed to detect desired symbols. Thus, 8×8 metric calculations are required for 8PSK, and 16×16 metric calculations for 16QAM. These codes can be decoded very quickly by reducing the number of required computations utilizing the characteristics of PSK and QAM.

Figure 6:
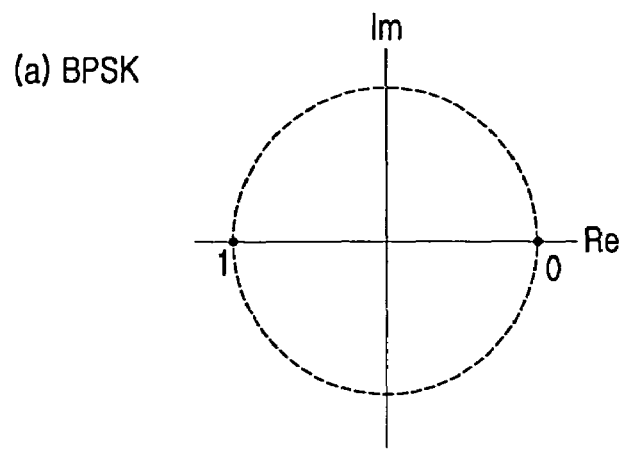
FIG. 6A illustrates a BPSK (Binary Phase Shift Keying) signal constellation.
FIG. 6B illustrates a QPSK (Quadrature PSK) signal constellation.
FIG. 6C illustrates a 8PSK (8-ary PSK) signal constellation.
Figure 6:
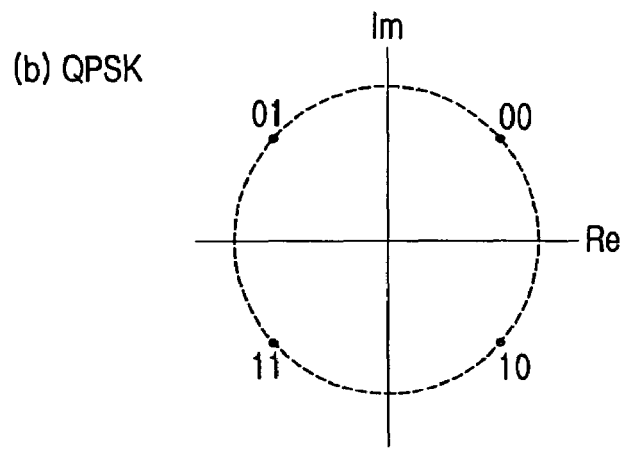
Figure 6:
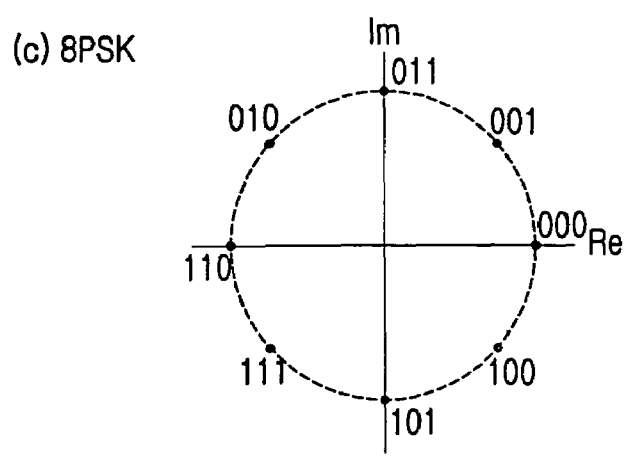

FIGS. 6A, 6B and 6C illustrate BPSK, QPSK, and 8PSK signal constellations, respectively. As shown, all PSK modulation symbols lie on a unit circle, which implies that their length is always 1.

For $U_6$, since $x_1$ and $x_3$ both have length 1, as shown in equation (42), minimizing the metric (35) is equivalent to minimizing $$|R_1-x_1|^2+|R_3-x_3|^2+|x_1 R_{13}-x_3|^2 \quad (42)$$

For each fixed $x_1$, as shown in equation (43), minimizing the sum of equation (42) is equivalent to minimizing $$|(R_3+x_1 R_{13})-x_3|^2 \quad (43)$$

Since $x_1$ is fixed, minimizing the metric of equation (43) is equivalent to finding the closest constellation point $x_3$ to $R_3+x_1 R_{13}$. It is possible to have one $x_3$ for each $x_1$. Thus, the receiver detects a symbol pair $(x_1, x_3)$ that minimizes the ML decoding metric of the first embodiment as desired reception symbols. For $x_2$ and $x_4$, the receiver similarly finds the closest constellation point $x_4$ to $R_4+x_2 R_{24}$ and detects a symbol pair $(x_2, x_4)$ that minimizes the ML decoding metric as desired $x_2$ and $x_4$. The same procedure is applied to other PSK transmission coding matrices.

Figure 7:
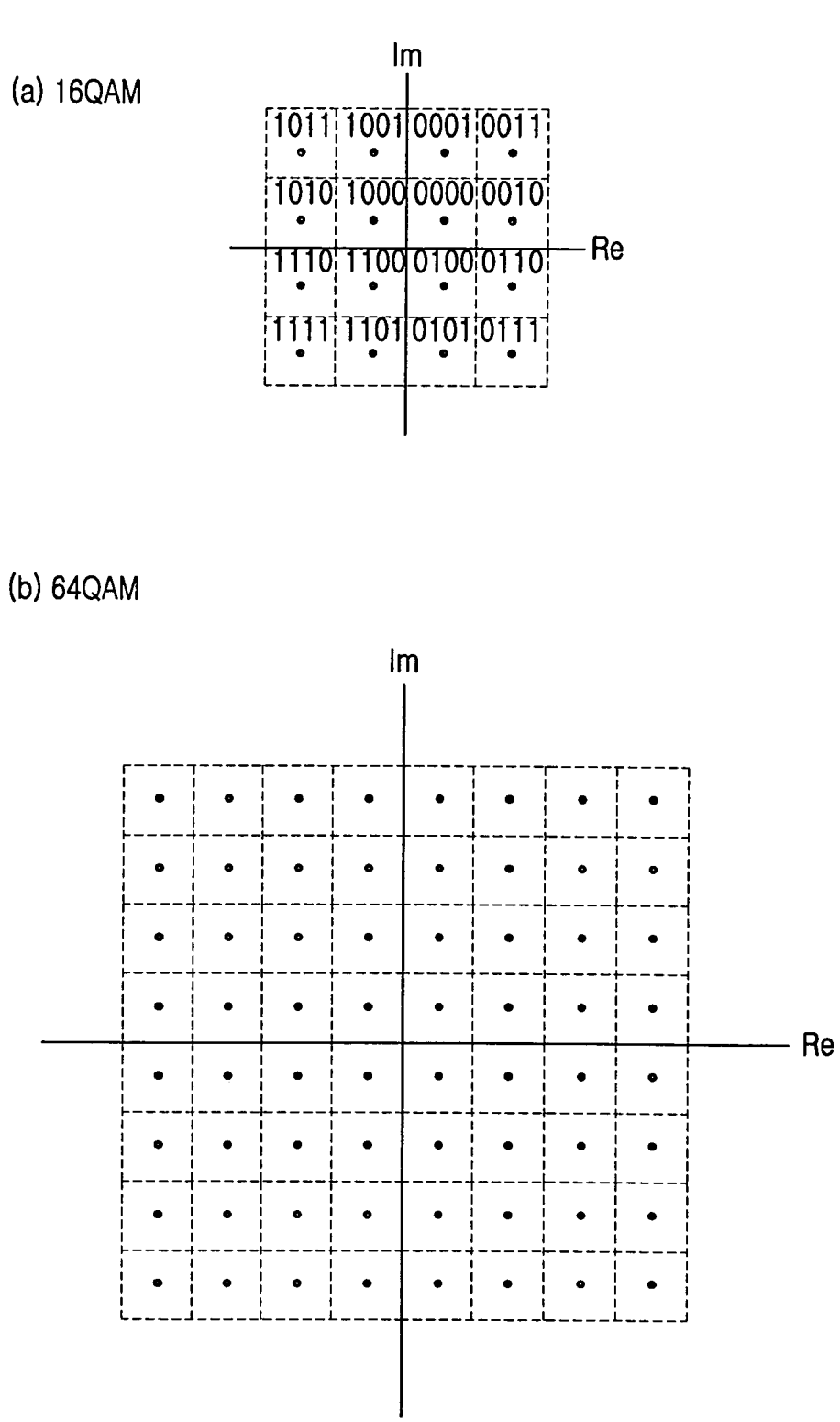
FIG. 7A illustrates a 16QAM (16-ary Quadrature Amplitude Modulation) signal constellation.
FIG. 7B illustrates a 64QAM (64-ary QAM) signal constellation.

With regard to QAM decoding, all 16QAM or 64QAM symbols have different lengths, as illustrated in FIGS. 7a and 7B, and the metric (39) is used for QAM codes. When $x_1$ is fixed, as shown in equation (44), minimizing the metric (39) over all possible values for $x_3$ is equivalent to minimizing $$|(R_3+x_1 R_{13})-x_3|^2+|R_1-x_1|^2 \quad (44)$$

For each fixed $x_1$, minimizing the metric of equation (44) is equivalent to finding the closest constellation point $x_3$ to $R_3+x_1 R_{13}$. Thus, the receiver detects all symbol pairs $(x_1, x_3)$ and detects the minimizing symbol pair $(x_1, x_3)$. For $x_2$ and $x_4$, the receiver similarly finds the closest constellation point $x_4$ to $R_4+x_2 R_{24}$ and detects the minimizing symbol pair $(x_2, x_4)$. The same procedure is applied to other QAM transmission coding matrices.

Figure 8:
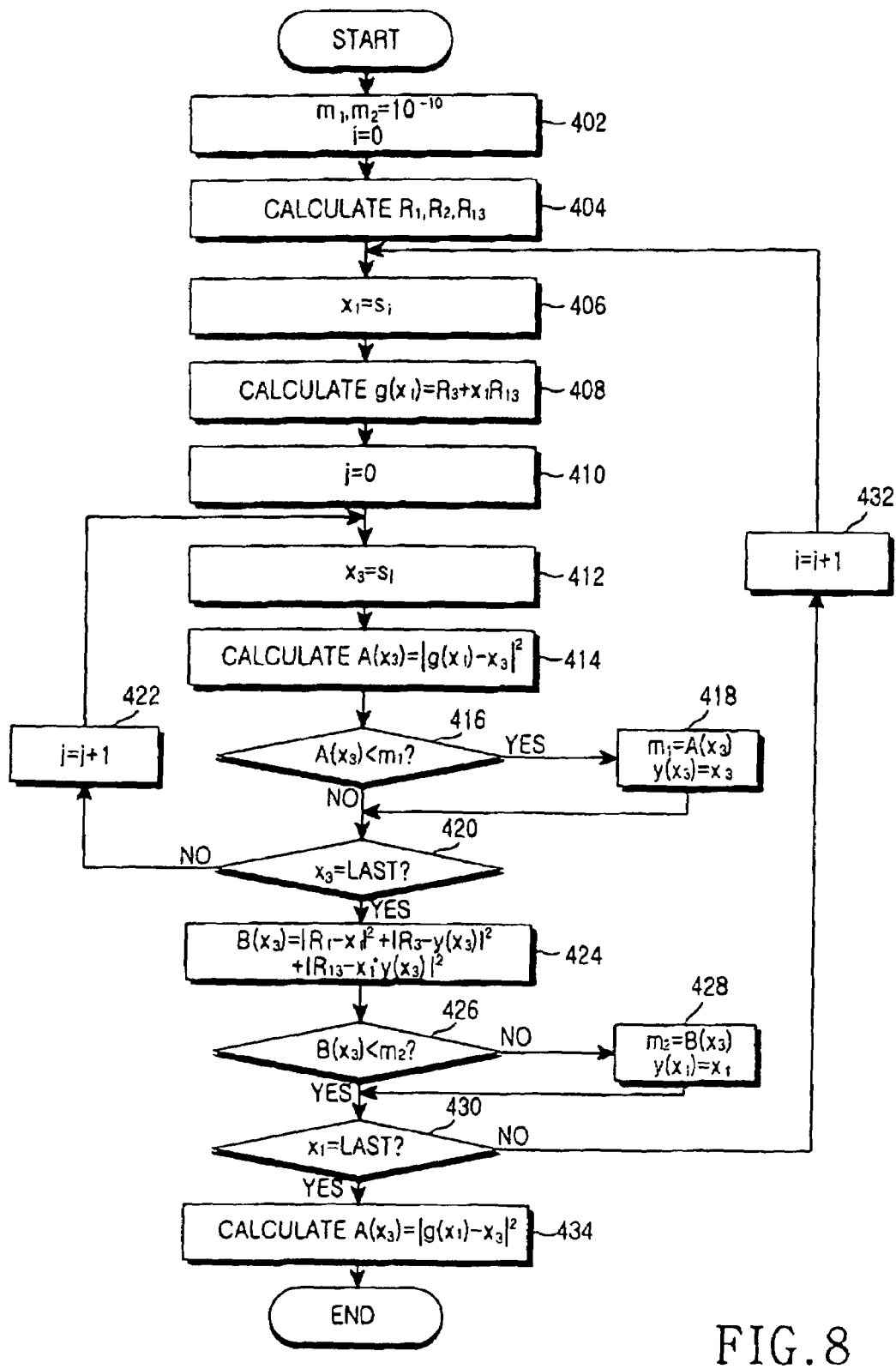
FIG. 8 is a flowchart illustrating another embodiment of decoding according to the present invention.

FIG. 8 is a flowchart illustrating the second embodiment of decoding according to the present invention. While the procedure is described as being performed for detection of only one symbol pair, it is to be noted that the other symbol pairs are detected in the same manner.

Referring to FIG. 8, thresholds $m_1$ and $m_2$ are set to a very small number, for example, $10^{-10}$ and symbol index i is set to 0 in step 402. The receiver computes parameters $R_1$, $R_2$, and $R_{13}$ using signals received for a plurality of time periods and estimated channel gains in step 404. In step 406, a first symbol $x_1$ is set to $s_i$. The receiver computes $g(x_1)=R_3+x_1 R_{13}$ in step 408. The receiver sets variable j to an initial value 0 in step 410, sets a second symbol $x_3$ to $s_j$ in step 412, and computes $A(x_3)=|g(x_1)-x_3|^2$ in step 414.

In step 416, $A(x_3)$ is compared with threshold $m_1$. If $A(x_3)$ is equal to or greater than threshold $m_1$, the receiver proceeds to step 420. On the contrary, if $A(x_3)$ is less than $m_1$, $m_1$ is updated to $A(x_3)$ and $y(x_3)$ is set as $x_3$ in step 418. In step 420, it is determined whether $x_3$ is the last symbol, for example, if i=16 for 16QAM. If it is, it is determined that the second symbol $s_j$ matching the first symbol $s_i$ has been detected and the receiver proceeds to step 424. Otherwise, the receiver increases variable j by 1 in step 422 and returns to step 412.

In step 424, the receiver computes $B(x_3)=|R_1-x_1|^2+|R_3-y(x_3)|^2+|R_{13}-x^*_1 y(x_3)|^2$. If $B(x_3)$ is equal to or greater than threshold $m_2$, the receiver proceeds to step 430. Otherwise, it proceeds to step 428. The receiver updates $m_2$ to $B(x_3)$ and sets $y(x_1)$ as $x_1$ in step 428. In step 430, it is determined whether $x_1$ is the last symbol, for example, if i=16 for 16QAM. If it is, it is determined that the second symbols $s_j$ matching all first symbols $s_i$ have been detected and the receiver proceeds to step 434. Otherwise, the receiver increases variable i by 1 in step 432 and returns to step 406. In step 434, the receiver finally detects $y(x_1)$ and $y(x_3)$.

Figure 9:
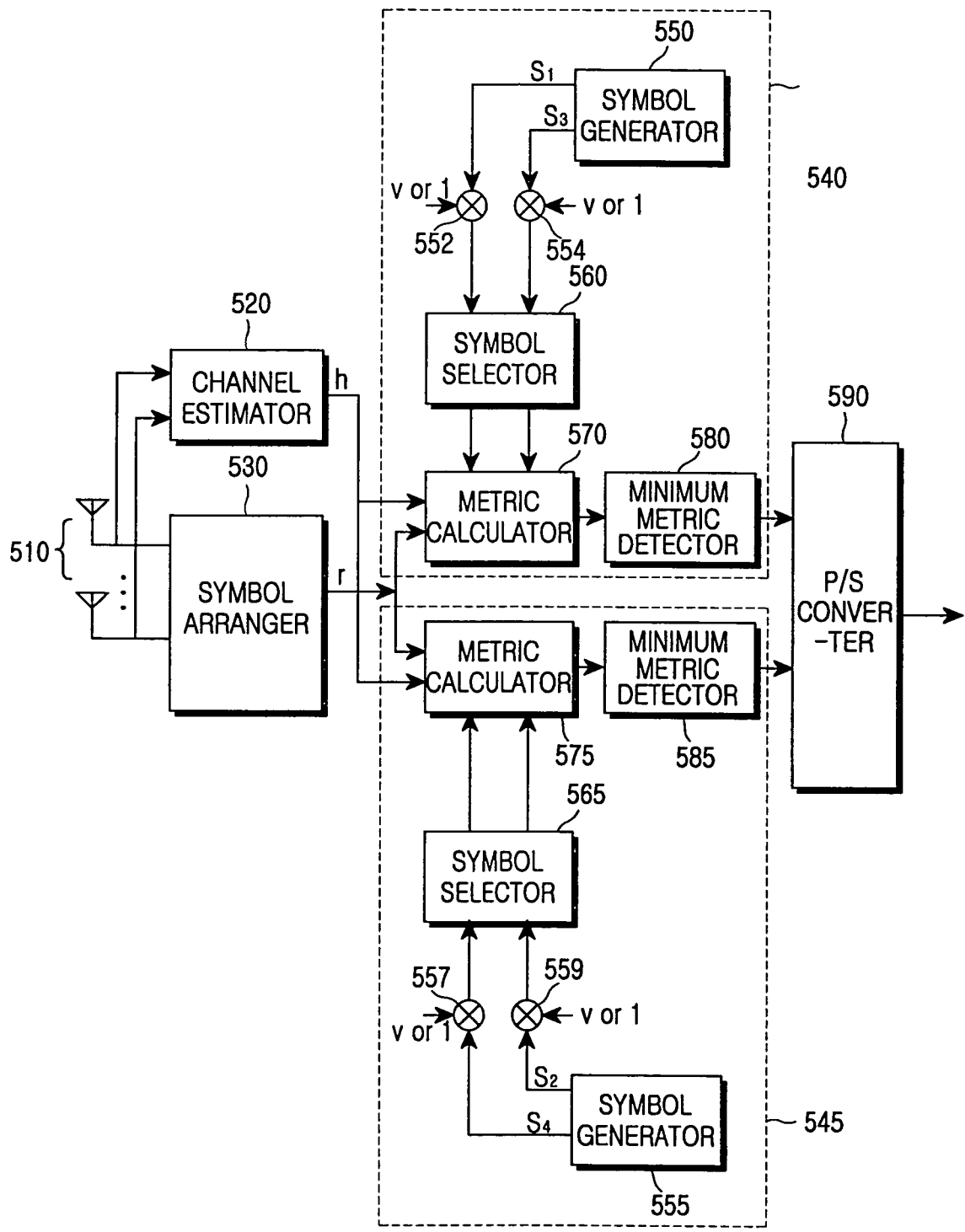
FIG. 9 is a block diagram of a receiver for performing decoding according to the second embodiment of the present invention.

FIG. 9 is a block diagram of a receiver that decodes according to the second embodiment of the present invention. The receiver is comprised of two independent decoders 540 and 545.

Referring to FIG. 9, a channel estimator 520 estimates channel coefficients representing channel gains from a plurality of transmit antennas to a plurality of receive antennas 510. A symbol arranger 530 collects symbols received from the receive antennas 510 for the four time periods corresponding to transmission by the transmitter illustrated in FIG. 3 or FIG. 4 of one block of symbols at four times.

The symbol arranger 530 forms a matrix out of the collected symbols. In the matrix, symbols received from the same receive antenna are arranged in the same row and symbols received at the same time are arranged in the same column. Although the plurality of receive antennas 510 are illustrated, decoding for the case of one antenna will be described below, for notational simplicity.

If four symbols to be detected are $x_1$, $x_2$, $x_3$ and $x_4$, the first decoder 540 detects $x_1$ and $x_3$ and the second decoder 545 detects $x_2$ and $x_4$, based on the channel gains and the received symbols. Thus, the decoders 540 and 545 detect the four symbols $x_1$, $x_2$, $x_3$ and $x_4$ simultaneously.

In the first decoder 540, a symbol generator 550 generates all possible symbol pairs and phase rotators 552 and 554 rotate at least one symbol of each symbol pair by the phase value v used in the transmitter or by 1. The number of all possible symbol pairs is the square of a modulation order used, for example, $16^2$ for 16QAM.

A symbol selector 560 computes the parameters $R_1$, $R_3$, and $R_{13}$ and selects symbol pairs that minimize the metric (43) or (44) according to the parameters. The number of the selected symbol pairs is equal to the modulation order. For example, 16 symbol pairs are selected according to the metric (44), for 16QAM.

A metric calculator 570 calculates the metric values of the selected symbol pairs using the parameters according to a modulation scheme and the number of the transmit antennas. A minimum metric detector 580 detects one symbol pair having a minimum metric value using the computed metric values. The metric computation is performed by Eq. (19), (23), (27), (31), (35) or (39) shown above.

The second decoder 545 operates in the same manner. After the first and second decoders 540 and 545 detect $x_1$ & $x_3$ and $x_2$ & $x_4$, respectively, a P/S converter 590 arranges the detected symbols in the right order and outputs the recovered symbol combination of $x_1$, $x_2$, $x_3$, and $x_4$.

Assuming a $2^b$ PSK signal constellation, once $R_1$, $R_3$ and $R_{13}$ are computed, b summations and $2^b$ multiplications are required for computation of $g(x_1)$, $2^b$ comparisons, one for each $g(x_1)$, are required for computing $y(x_3)$, and finally $3 \times 2^b$ multiplications and additions are performed for computing $B(x_3)$. Therefore, the same symbol detection performance as that of the ML decoding according to the first embodiment can be achieved with a total of $4 \times 2^b$ additions and multiplications and $2^b$ comparisons according to the second embodiment of the present invention.

Decoding According to the Third Embodiment

QPSK or 8PSK symbols can be decoded with a reduced volume of computations despite a lower symbol detection performance, as compared to decoding methods according to the first and second embodiments.

For 8PSK symbols, the receiver computes the parameters $R_1$, $R_3$ and $R_{13}$ and finds the closest constellation points $q_1$ to $R_1$, $q_3$ to $R_3$, and $q_{13}$ to $R_{13}$. If $q_{13}=q_1*q_3$, the receiver outputs $q_1$ and $q_3$.

If not, the receiver computes an angle $\Phi_d$ by dividing the angle between $q_{13}$ and $q_1*q_3$ by 2. Then the receiver searches for desired first and second symbols by calculating the ML decoding metric values of first symbol and second symbol candidates whose angles are respectively within the angular distance $\Phi_d$ from $q_1$ and $q_3$.

Similarly, the receiver computes the parameters $R_2$, $R_4$ and $R_{24}$ and finds the closest constellation points $q_2$ to $R_2$, $q_4$ to $R_4$, and $q_{24}$ to $R_{24}$. If $q_{24}=q_2*q_4$, the receiver outputs $q_2$ and $q_4$.

If not, the receiver computes an angle $\Phi_d'$ by dividing the angle between $q_{24}$ and $q_2*q_4$ by 2. Then the receiver searches for desired first and second symbols by calculating the ML decoding metric values of first symbol and second symbol candidates whose angles are respectively within the angular distance $\Phi_d'$ from $q_2$ and $q_4$.

Figure 10:
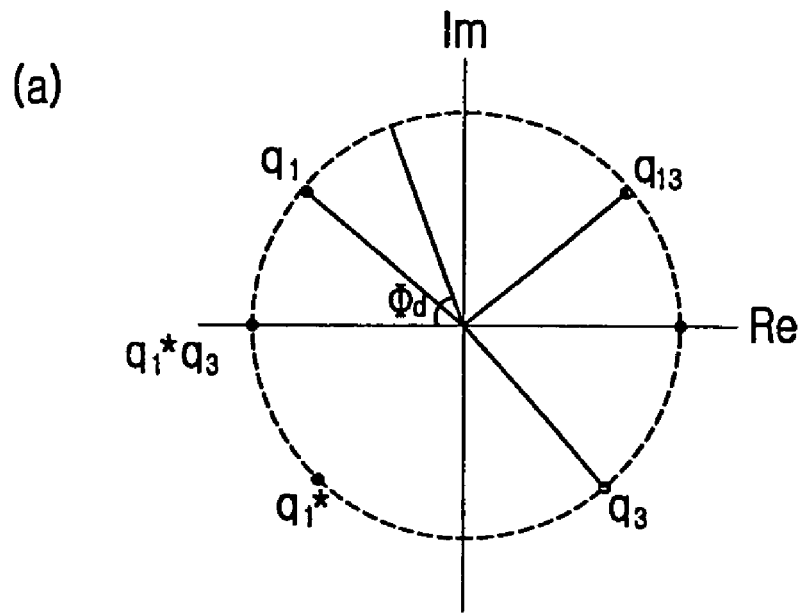
FIGS. 10A and 10B depict sub-optimal decoding according to the present invention.
Figure 10:
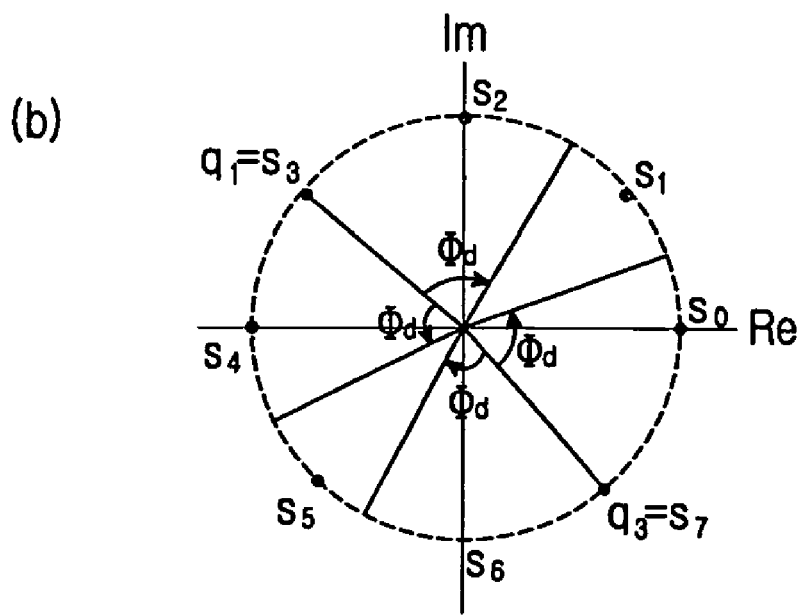

FIGS. 10A and 10B illustrate 8PSK signal constellations to depict sub-optimal decoding according to the present invention. Referring to FIG. 10A, the closest constellation point $q_1$ to $R_1$ is $e^{j(3\pi/4)}$, the closest constellation point $q_3$ to $R_3$ is $e^{j(-\pi/4)}$, and the closest constellation point $q_{13}$ to $R_{13}$ is $e^{j(\pi/4)}$. $q_1*q_3$ is $e^{j(\pi)}$ and $\Phi_d'=3\pi/8$.

Referring to FIG. 10B, the receiver searches for a symbol pair that minimizes the ML decoding metric over all possible symbol pairs made out of first symbol candidates $s_2$, $s_3$ and $s_4$ which are within $3\pi/8$ from $q_1$ and second symbol candidates $s_0$, $s_6$ and $s_7$ which are within $3\pi/8$ from $q_3$. The same process is applied to other PSK transmission coding matrices.

Figure 11:
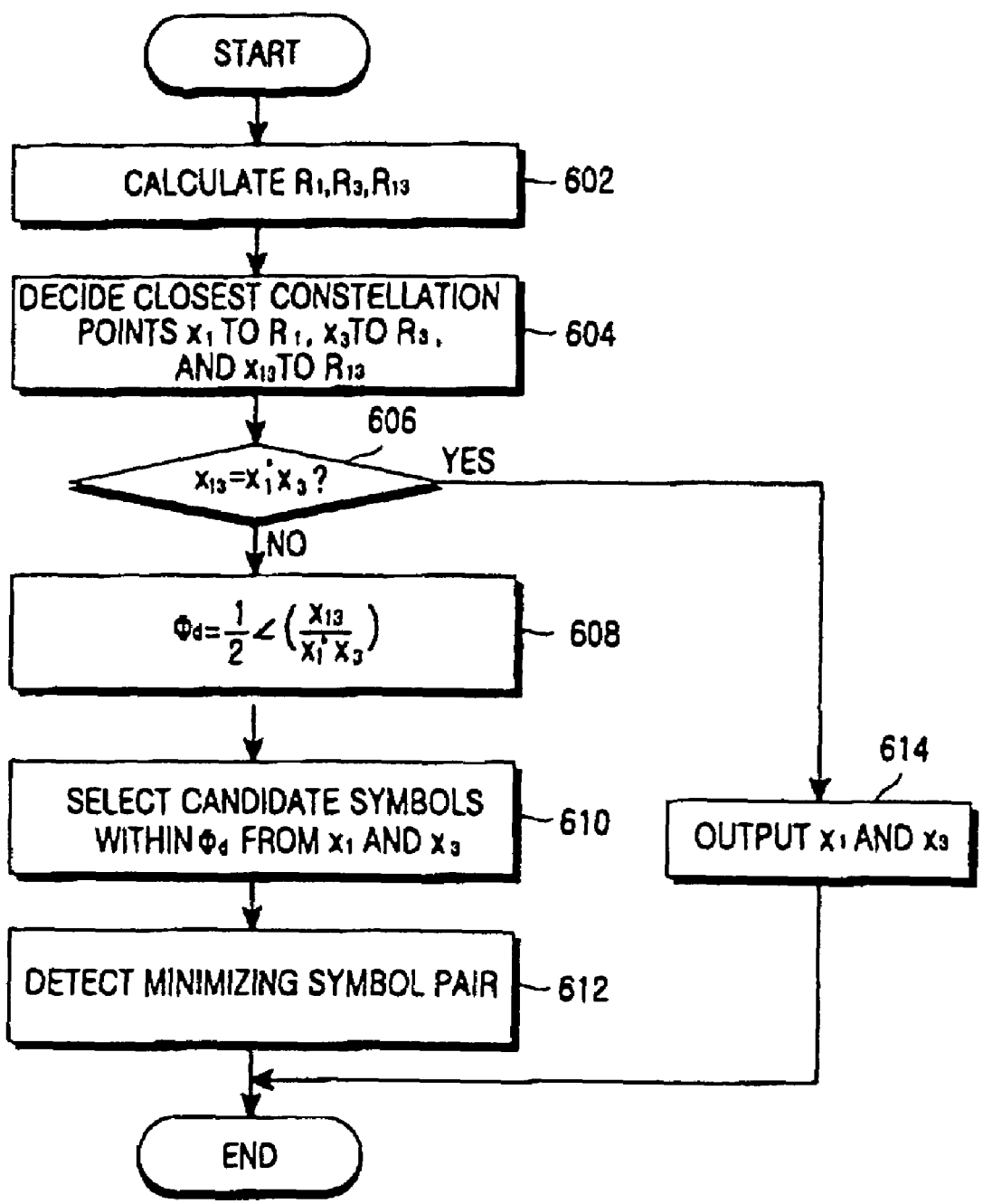
FIG. 11 is a flowchart illustrating a third embodiment of decoding according to the present invention.

FIG. 11 is a flowchart illustrating decoding according to the third embodiment of the present invention. For notational simplicity, the decoding is carried out for only one symbol pair.

Referring to FIG. 11, the receiver computes the parameters $R_1$, $R_3$ and $R_{13}$ in step 602 and finds the closest constellation points $x_1$ to $R_1$, $x_3$ to $R_3$, and $x_{13}$ to $R_{13}$ in step 604. If $x_{13}=x_1*x_3$ in step 606, the receiver outputs $x_1$ and $x_3$.

If not, the receiver computes $$\Phi_d = \frac{1}{2} \angle \left( \frac{x_{13}}{x_1^* x_3} \right)$$

in step 608 and selects first symbol and second symbol candidates whose angles are respectively within the angular distance $\Phi_d$ from $x_1$ and $x_3$ in step 610. In step 612, the receiver detects a symbol pair that minimizes the ML decoding metric of the first embodiment by calculating the ML decoding metric values of all possible symbol pairs made out of the first and second symbol candidates.

For the sub-optimal decoding, the receiver is configured in hardware as illustrated in FIG. 9. The symbol selector 560 computes the parameters $R_1$, $R_3$ and $R_{13}$, finds the closest constellation points to $R_1$, $R_3$, and to $R_{13}$, computes the angle $\Phi_d$, and selects candidate symbols within $\Phi_d$ from the constellation points. For QPSK, up to 3×3 candidate symbol pairs are produced from the candidate symbols and for 8PSK, the number of the candidate symbol pairs is up to 5×5.

The metric calculator 570 calculates the metric values of the symbol pairs using Eq. (19), (23), (27), (31), (35), or (39) and the minimum metric detector 580 detects one symbol pair having a minimum metric value.

The second decoder 545 operates in the same manner. Thus, the first decoder 540 detects $x_1$ and $x_3$ and the second decoder 545 detects $x_2$ and $x_4$. The P/S converter 590 arranges the detected symbols in the right order and outputs the recovered symbol combination of $x_1$, $x_2$, $x_3$ and $x_4$.

Figure 12:
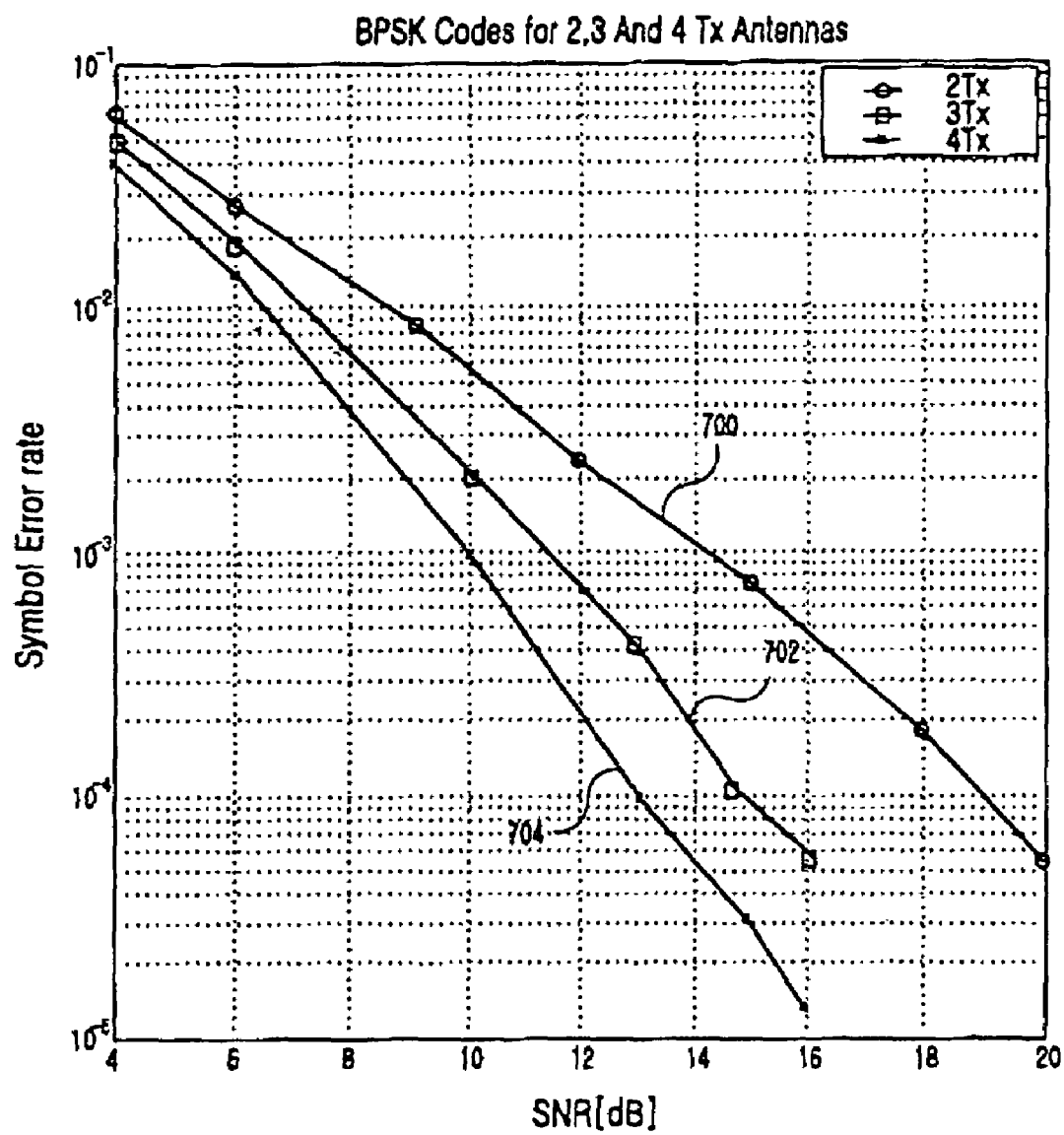
FIG. 12 is a graph illustrating symbol error rate (SER) versus SNR (Signal to Noise Ratio) for 2, 3 and 4 transmit antennas transmitting BPSK codes.
Figure 13:
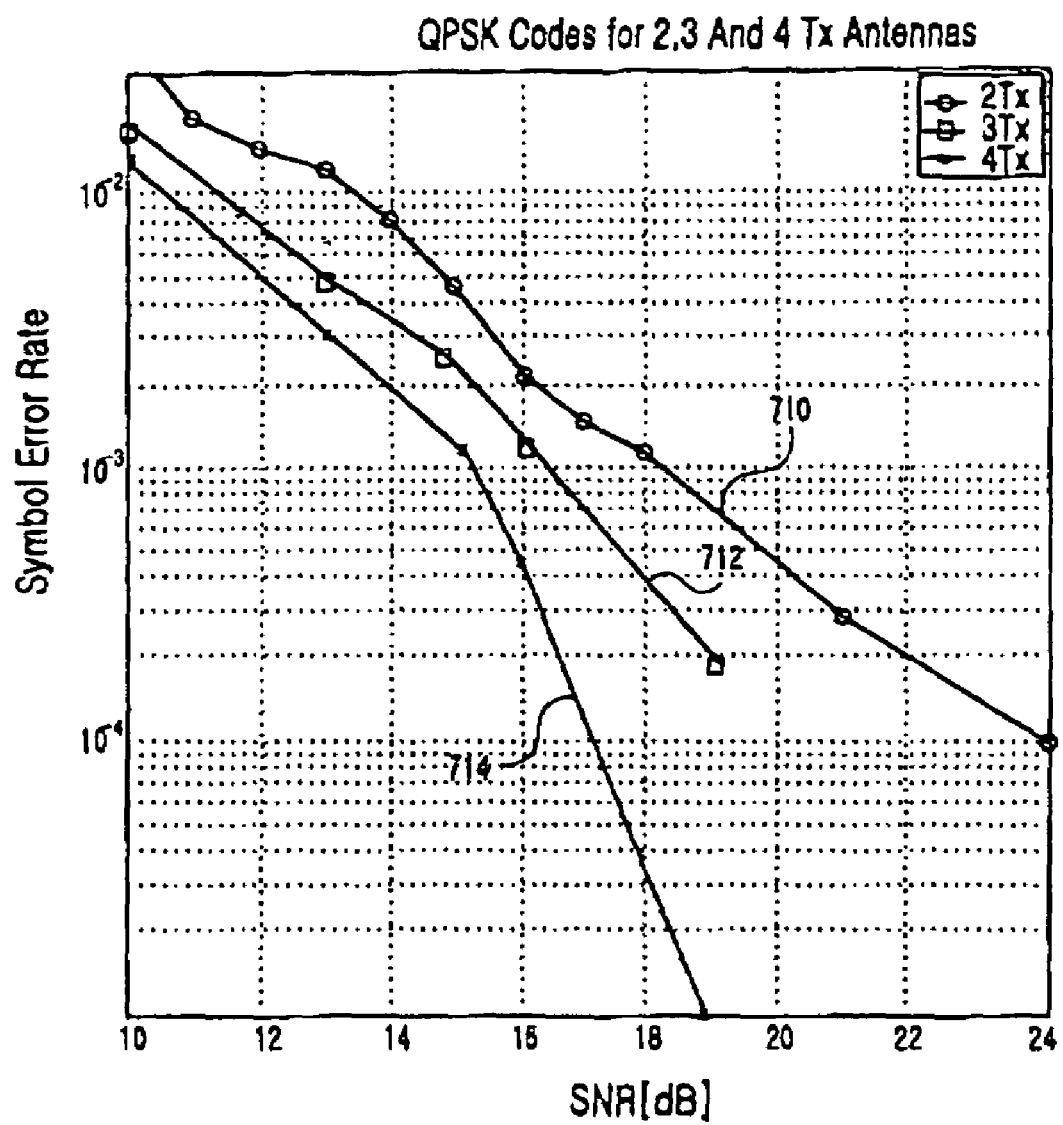
FIG. 13 is a graph illustrating SER versus SNR for 2, 3 and 4 transmit antennas transmitting QPSK codes.
Figure 14:
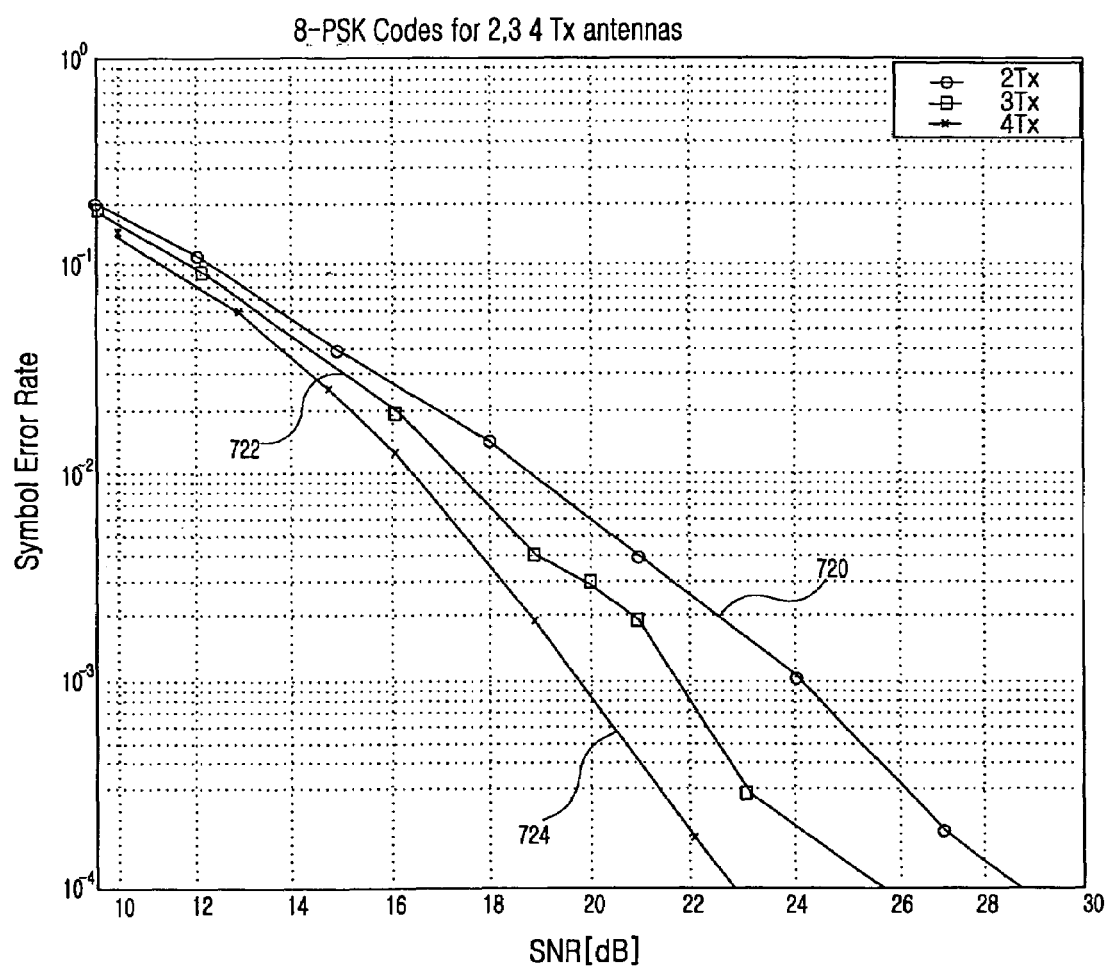
FIG. 14 is a graph illustrating SER versus SNR for 2, 3 and 4 transmit antennas transmitting 8PSK codes.

FIGS. 12, 13 and 14 are graphs illustrating SER versus SNR from ML decoding for BPSK, QPSK, and 8PSK, respectively, assuming 2, 3 and 4 transmit antennas and, for example, one receive antenna in the first embodiment of the present invention.

In FIG. 12, reference numerals 700, 702 and 704 denote SERs for 2, 3, and 4 transmit antennas, respectively. In FIG. 13, reference numerals 710, 712 and 714 denote SERs for 2, 3, and 4 transmit antennas, respectively. In FIG. 14, reference numerals 720, 722 and 724 denote SERs for 2, 3, and 4 transmit antennas, respectively.

The relation between SER and SNR is given by equation (45):

$$SER = C \cdot SNR^{-d} \quad (45)$$

where C is a constant and d is a diversity gain. Therefore, log(SER)=−d·log(C·SNR) in FIGS. 12, 13 and 14. With log (SNR) on an X axis, y=−dx. Thus, d is the inclination. In other words, the inclination of the SER-SNR graph on a log scale is the diversity gain. As noted from FIGS. 12, 13 and 14, the transmit diversity of the present invention offers a diversity order equal to the number of transmit antennas, that is, a maximum diversity order.

Figure 15:
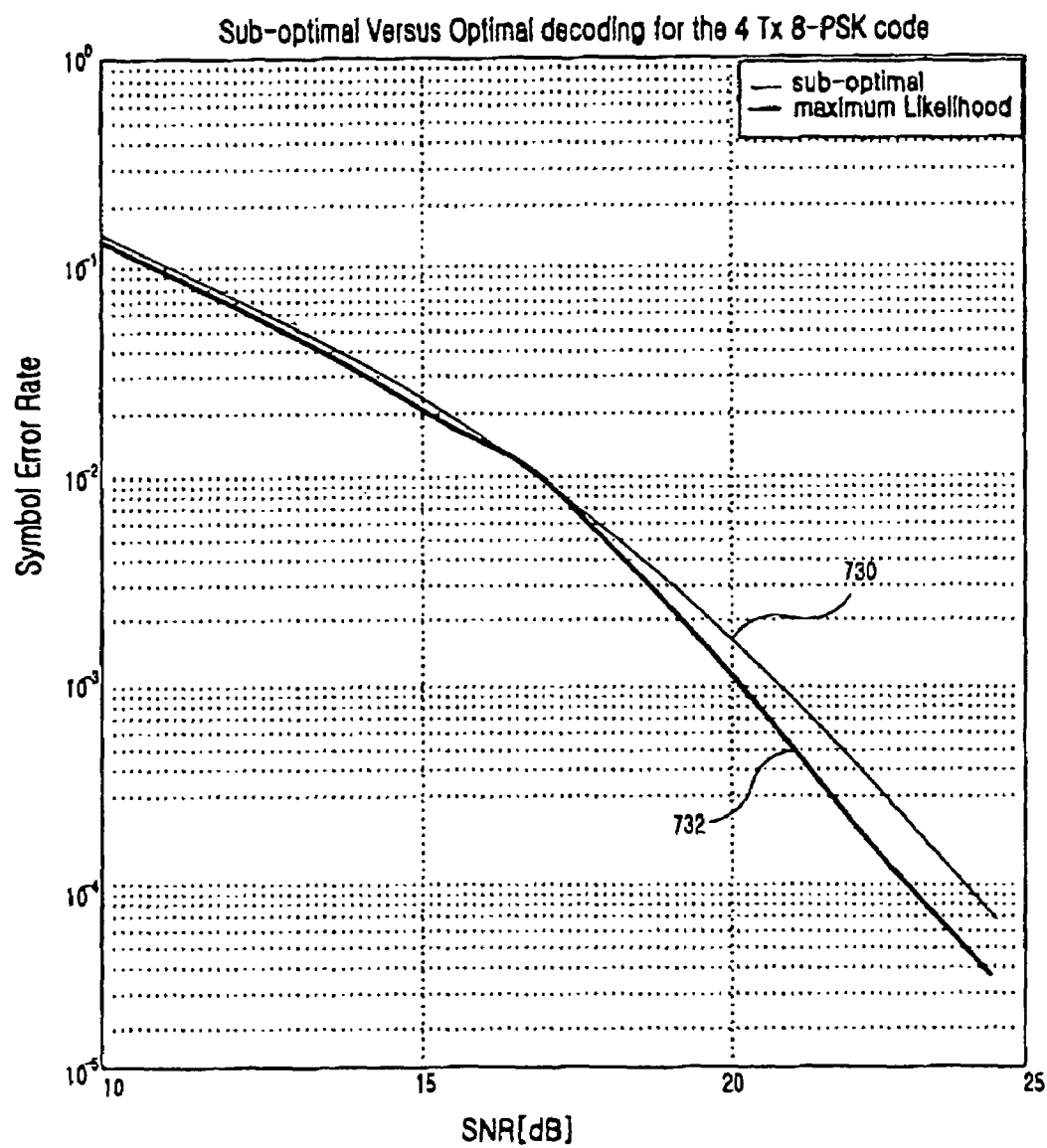
FIG. 15 is a graph illustrating SER versus SNR for the first and third embodiments of decoding according to the present invention.

FIG. 15 is a graph comparing SERs between the decoding schemes of the first and third embodiments for four transmit antennas transmitting 8PSK symbols according to the present invention. Reference numeral 732 denotes the sub-optimal decoding according to the third embodiment and reference numeral 730 denotes the ML decoding according to the first embodiment. The sub-optimal decoding still provides a maximum diversity gain despite a slightly degraded performance as compared to the ML decoding.

As described above, the present invention advantageously provides a maximum diversity gain for space-time block codes with three or more transmit antennas and simplifies the structure of a decoder for detecting transmission symbols in a receiver. Therefore, a data processing rate is increased and system development cost is saved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter for transmitting modulation symbols in a wireless communication system, comprising:
   a plurality of transmit antennas for achieving transmit diversity;
   a space time encoder for generating a transmission coding matrix with four rows corresponding to transmission time periods and four columns corresponding to the transmit antennas when the number of the transmit antennas is 4, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
   a phase rotator part for selectively rotating the phases of some of the symbols in the at least two columns of the transmission coding matrix by a predetermined phase value,
   wherein the transmission coding matrix is one of $$\begin{bmatrix} s_1 & s_2 & s_3^* & s_4^* \\ s_2^* & -s_1^* & s_4 & -s_3 \\ s_3 & s_4 & -s_1^* & -s_2^* \\ s_4^* & -s_3^* & -s_2 & s_1 \end{bmatrix} \begin{bmatrix} s_1 & s_2 & s_3^* & -s_4^* \\ s_2^* & -s_1^* & s_4 & s_3 \\ s_3 & s_4 & -s_1^* & s_2^* \\ s_4^* & -s_3^* & -s_2 & -s_1 \end{bmatrix} \begin{bmatrix} s_1 & s_2 & s_3^* & -s_4^* \\ s_2^* & -s_1^* & -s_4 & -s_3 \\ s_3 & s_4 & -s_1^* & s_2^* \\ s_4^* & -s_3^* & s_2 & s_1 \end{bmatrix}$$

$$\begin{bmatrix} s_1 & s_2 & -s_3^* & s_4^* \\ s_2^* & -s_1^* & -s_4 & s_3 \\ s_3 & s_4 & s_1^* & s_2^* \\ s_4^* & -s_3^* & s_2 & -s_1 \end{bmatrix} \begin{bmatrix} s_1 & s_2 & -s_3^* & -s_4^* \\ s_2^* & -s_1^* & s_4 & -s_3 \\ s_3 & s_4 & s_1^* & s_2^* \\ s_4^* & -s_3^* & -s_2 & s_1 \end{bmatrix} \begin{bmatrix} s_1 & s_2 & -s_3^* & s_4^* \\ s_2^* & -s_1^* & s_4 & s_3 \\ s_3 & s_4 & s_1^* & -s_2^* \\ s_4^* & -s_3^* & -s_2 & -s_1 \end{bmatrix}$$

$$\begin{bmatrix} s_1 & s_2 & -s_3^* & -s_4^* \\ s_2^* & -s_1^* & -s_4 & s_3 \\ s_3 & s_4 & s_1^* & -s_2^* \\ s_4^* & -s_3^* & s_2 & -s_1 \end{bmatrix} \begin{bmatrix} s_1 & s_2 & -s_3^* & s_4^* \\ s_2^* & -s_1^* & -s_4 & -s_3 \\ s_3 & s_4 & s_1^* & -s_2^* \\ s_4^* & -s_3^* & s_2 & s_1 \end{bmatrix}$$

where $s_1$, $s_2$, $s_3$ and $s_4$ represent four input symbols.

2. The transmitter for transmitting modulation symbols in a wireless communication system, comprising:
   a pluralilty of transmit antennas for achieving transmit diversity;
   a space time encoder for generating a transmission coding matrix with four rows corresponding to transmission time periods and four columns corresponding to the transmit antennas when the number of the transmit antennas is 4, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
   a phase rotator part for selectively rotating the phases of some of the symbols in the at least two columns of the transmission coding matrix by a predetermined phase value,
   wherein if the input symbols are BPSK (Binary Phase Shift Keying) symbols, the transmission coding matrix is $$U_2 = \begin{pmatrix} s_1 & s_2 & js_3 & s_4 \\ -s_2^* & s_1^* & -js_4^* & s_3^* \\ -s_4^* & -s_3^* & js_2^* & s_1^* \\ s_3 & -s_4 & -js_1 & s_2 \end{pmatrix}$$

where $s_1$, $s_2$, $s_3$ and $s_4$ represent four input symbols.

3. A transmitter for transmitting modulation symbols in a wireless communication system, comprising:
   a plurality of transmit antennas for achieving transmit diversity;
   a space time encoder for generating a transmission coding matrix with four rows corresponding to transmission time periods and four columns corresponding to the transmit antennas when the number of the transmit antennas is 4, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
   a phase rotator part for selectively rotating the phases of some of the symbols in the at least two columns of the transmission coding matrix by a predetermined phase value, wherein if the input symbols are QPSK (Quadrature Phase Shift Keying) symbols, the transmission coding matrix is $$U_4 = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix}$$

where $s_1, s_2, s_3$ and $s_4$ represent four input symbols and v is the predetermined phase value.

4. The transmitter of claim 3, wherein v is $e^{-j2\pi/3}$.

5. A transmitter for transmitting modulation symbols in a wireless communication system, comprising:
a plurality of transmit antennas for achieving transmit diversity;
a space time encoder for generating a transmission coding matrix with four rows corresponding to transmission time periods and four columns corresponding to the transmit antennas when the number of the transmit antennas is 4, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
a phase rotator part for selectively rotating the phases of some of the symbols in the at least two columns of the transmission coding matrix by a predetermined phase value,
wherein if the input symbols are 8PSK (8-ary Phase Shift Keying) symbols, the transmission coding matrix is $$U_6 = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix}$$

where $s_1, s_2, s_3$ and $s_4$ represent four input symbols and v is the predetermined phase value.

6. The transmitter of claim 5, wherein v is $e^{-j5\pi/6}$.

7. A transmitter for transmitting modulation symbols in a wireless communication system, comprising:
a plurality of transmit antennas for achieving transmit diversity;
a space time encoder for generating a transmission coding matrix with four rows corresponding to transmission time periods and four columns corresponding to the transmit antennas when the number of the transmit antennas is 4, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
a phase rotator part for selectively rotating the phases of some of the symbols in the at least two columns of the transmission coding matrix by a predetermined phase value, wherein if the input symbols are 16QAM (16-ary Quadrature Amplitude Modulation) symbols, the transmission coding matrix is $$U_8 = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix}$$

where $s_1, s_2, s_3$ and $s_4$ represent four input symbols and v is the predetermined phase value.

8. The transmitter of claim 7, wherein v is $e^{-j5\pi/12}$.

9. A transmitter for transmitting modulation symbols in a wireless communication system, comprising:
a plurality of transmit antennas for achieving transmit diversity;
a space time encoder for generating a transmission coding matrix with four rows corresponding to transmission time periods and four columns corresponding to the transmit antennas when the number of the transmit antennas is 4, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
a phase rotator part for selectively rotating the phases of some of the symbols in the at least two columns of the transmission coding matrix by a predetermined phase value,
wherein if the input symbols are 64QAM (64-ary Quadrature Amplitude Modulation) symbols, the transmission coding matrix is $$U_{10} = \begin{pmatrix} s_1 & s_2 & s_3 & s_4 \\ -s_2^* & s_1^* & -vs_4^* & vs_3^* \\ -s_4^* & -s_3^* & s_2^* & s_1^* \\ s_3 & -s_4 & -vs_1 & vs_2 \end{pmatrix}$$

where $s_1, s_2, s_3$ and $s_4$ represent four input symbols and v is the predetermined phase value.

10. The transmitter of claim 9, wherein v is $e^{-j7\pi/48}$.

11. A transmitter for transmitting modulation symbols in a wireless communication system, comprising:
three transmit antennas for achieving transmit diversity;
a space time encoder for generating a transmission coding matrix with four rows corresponding to transmission time periods and three columns corresponding to the transmit antennas, encoding a plurality of input symbols into a plurality of symbol combinations to transmit the input symbols once from each transmit antenna at each time period by using the transmission coding matrix, and outputting the symbol combinations to the transmit antennas during the transmission time periods, the symbol combinations having orthogonal symbols, inversions and conjugates of the input symbols; and
a phase rotator part for selectively rotating the phases of some of the symbols in the at least two columns of the transmission coding matrix by a predetermined phase value, wherein the transmitter further comprises a column generator for generating a new column by summing the symbols of the selected two columns containing phase-rotated symbols and replacing the selected two columns with the new column, thereby generating the transmission coding matrix with four rows and three columns.

12. The transmitter of claim 11, wherein the transmission coding matrix generated from the encoder is one of $$\begin{bmatrix} (s_1+s_2)/\sqrt{2} & s_1^* & s_4^* \\ (s_2^*-s_1^*)/\sqrt{2} & s_4 & -s_3 \\ (S_3+s_4)/\sqrt{2} & -s_1^* & -s_2^* \\ (s_4^*-s_3^*)/\sqrt{2} & -s_2 & s_1 \end{bmatrix} \begin{bmatrix} s_1(s_2+s_3^*)/\sqrt{2} & s_4^* \\ s_2^*(-s_1^*+s_4)/\sqrt{2} & -s_3 \\ s_3(s_4-s_1^*)/\sqrt{2} & -s_2^* \\ s_4^*(-s_3^*-s_2)/\sqrt{2} & s_1 \end{bmatrix} \begin{bmatrix} s_1 & s_3 & (s_3^*+s_4^*)/\sqrt{2} \\ s_2^* & -s_1^* & (s_4-s_3)/\sqrt{2} \\ s_3 & s_2 & (-s_1^*-s_2^*)/\sqrt{2} \\ s_4^* & -s_4^* & (s_1-s_2)/\sqrt{2} \end{bmatrix}$$

$$\begin{bmatrix} (s_1+s_3^*)/\sqrt{2} & s_2 & s_4^* \\ (s_2^*-s_4)/\sqrt{2} & -s_1^* & -s_3 \\ (s_3-s_1^*)/\sqrt{2} & s_4 & -s_{2^*} \\ (s_1^*-s_3)/\sqrt{2} & -s_3^* & s_1 \end{bmatrix} \begin{bmatrix} s_1 & (s_2+s_4^*)/\sqrt{2} & s_3^* \\ s_2^* & (-s_1^*-s_1)/\sqrt{2} & s_4 \\ s_3 & (s_2-s_2^*)/\sqrt{2} & -s_1^* \\ s_4^* & (-s_3^*+s_1)/\sqrt{2} & s_2 \end{bmatrix} \begin{bmatrix} s_2 & s_3 & (s_1+s_4^*)/\sqrt{2} \\ -s_1^* & s_4 & (s_2^*-s_3)/\sqrt{2} \\ s_4 & -s_1^* & (s_3-s_2^*)/\sqrt{2} \\ s_3^* & -s_3 & (s_4^*+s_1)/\sqrt{2} \end{bmatrix}$$

where $s_1$, $s_2$, $s_3$ and $s_4$ represent four input symbols.

13. The transmitter of claim 11, wherein if the input symbols are BPSK symbols, the transmission coding matrix is $$U_1 = \begin{pmatrix} s_1 & \dfrac{s_2+js_3}{\sqrt{2}} & s_4 \\ -s_2^* & \dfrac{s_1^*-js_4}{\sqrt{2}} & s_3^* \\ -s_4^* & \dfrac{-s_3^*+js_2^*}{\sqrt{2}} & s_1^* \\ s_3 & \dfrac{-s_4-js_1}{\sqrt{2}} & s_2 \end{pmatrix}$$

where $s_1$, $s_2$, $s_3$ and $s_4$ represent four input symbols.

14. The transmitter of claim 11, wherein if the input symbols are QPSK symbols, the transmission coding matrix is $$U_3 = \begin{pmatrix} s_1 & \dfrac{s_2+s_3}{\sqrt{2}} & s_4 \\ -s_2^* & \dfrac{s_1^*-vs_4^*}{\sqrt{2}} & vs_3^* \\ -s_4^* & \dfrac{-s_3^*+s_2^*}{\sqrt{2}} & s_1^* \\ s_3 & \dfrac{-s_4-vs_1}{\sqrt{2}} & vs_2 \end{pmatrix}$$

where $s_1$, $s_2$, $s_3$ and $s_4$ represent four input symbols and v is the predetermined phase value.

15. The transmitter of claim 14, wherein v is $e^{-j2\pi/3}$.

16. The transmitter of claim 11, wherein if the input symbols are 8PSK symbols, the transmission coding matrix is $$U_5 = \begin{pmatrix} s_1 & \dfrac{s_2+s_3}{\sqrt{2}} & s_4 \\ -s_2^* & \dfrac{s_1^*-vs_4^*}{\sqrt{2}} & vs_3^* \\ -s_4^* & \dfrac{-s_3^*+s_2^*}{\sqrt{2}} & s_1^* \\ s_3 & \dfrac{-s_4-vs_1}{\sqrt{2}} & vs_2 \end{pmatrix}$$

where $s_1$, $s_2$, $s_3$ and $s_4$ represent four input symbols and v is the predetermined phase value.

17. The transmitter of claim 16, wherein v is $e^{-j5\pi/6}$.

18. The transmitter of claim 11, wherein if the input symbols are 16QAM symbols, the transmission coding matrix is $$U_7 = \begin{pmatrix} s_1 & \dfrac{s_2+s_3}{\sqrt{2}} & s_4 \\ -s_2^* & \dfrac{s_1^*-vs_4^*}{\sqrt{2}} & vs_3^* \\ -s_4^* & \dfrac{-s_3^*+s_2^*}{\sqrt{2}} & s_1^* \\ s_3 & \dfrac{-s_4-vs_1}{\sqrt{2}} & vs_2 \end{pmatrix}$$

where $s_1$, $s_2$, $s_3$ and $s_4$ represent four input symbols and v is the predetermined phase value.

19. The transmitter of claim 18, wherein v is $e^{-j5\pi/12}$.

20. The transmitter of claim 11, wherein if the input symbols are 64QAM symbols, the transmission coding matrix is $$U_9 = \begin{pmatrix} s_1 & \frac{s_2+s_3}{\sqrt{2}} & s_4 \\ -s_2^* & \frac{s_1^*-vs_4^*}{\sqrt{2}} & vs_3^* \\ -s_4^* & \frac{-s_3^*+s_2^*}{\sqrt{2}} & s_1^* \\ s_3 & \frac{-s_4-vs_1}{\sqrt{2}} & vs_2 \end{pmatrix}$$

where $s_1, s_2, s_3$ and $s_4$ represent four input symbols and v is the predetermined phase value.

21. The transmitter of claim 20, wherein v is $e^{-j7\pi/48}$.

22. A method for transmitting modulation symbols in a wireless communication system, the method comprising steps of:

generating a transmission coding matrix with four rows corresponding to transmission time periods and four columns corresponding to four transmit antennas for achieving transmit diversity;

encoding a plurality of input symbols into a plurality of symbol combinations to transmit the input symbols once from each transmit antenna at each time period by using the transmission coding matrix;

outputting the symbol combinations to the each transmit antenna during the transmission time periods, the symbol combinations having orthogonal symbols, inversions and conjugates of the input symbols; and selectively rotating the phases of some of the symbols in the at least two columns of the transmission coding matrix by a predetermined phase value, wherein the transmission coding matrix is one of $$\begin{bmatrix} s_1 & s_2 & s_3^* & s_4^* \\ s_2^* & -s_1^* & s_4 & -s_3 \\ s_3 & s_4 & -s_1^* & -s_2^* \\ s_4^* & -s_3^* & -s_2 & s_1 \end{bmatrix} \begin{bmatrix} s_1 & s_2 & s_3^* & -s_4^* \\ s_2^* & -s_1^* & s_4 & s_3 \\ s_3 & s_4 & -s_1^* & s_2^* \\ s_4^* & -s_3^* & -s_2 & -s_1 \end{bmatrix} \begin{bmatrix} s_1 & s_2 & s_3^* & -s_4^* \\ s_2^* & -s_1^* & -s_4 & -s_3 \\ s_3 & s_4 & -s_1^* & s_2^* \\ s_4^* & -s_3^* & s_2 & s_1 \end{bmatrix}$$

$$\begin{bmatrix} s_1 & s_2 & s_3^* & s_4^* \\ s_2^* & -s_1^* & -s_4 & s_3 \\ s_3 & s_4 & -s_1^* & -s_2^* \\ s_4^* & -s_3^* & s_2 & -s_1 \end{bmatrix} \begin{bmatrix} s_1 & s_2 & -s_3^* & -s_4^* \\ s_2^* & -s_1^* & s_4 & -s_3 \\ s_3 & s_4 & s_1^* & s_2^* \\ s_4^* & -s_3^* & -s_2 & s_1 \end{bmatrix} \begin{bmatrix} s_1 & s_2 & -s_3^* & s_4^* \\ s_2^* & -s_1^* & s_4 & s_3 \\ s_3 & s_4 & s_1^* & -s_2^* \\ s_4^* & -s_3^* & -s_2 & -s_1 \end{bmatrix}$$

$$\begin{bmatrix} s_1 & s_2 & -s_3^* & -s_4^* \\ s_2^* & -s_1^* & -s_4 & s_3 \\ s_3 & s_4 & s_1^* & s_2^* \\ s_4^* & -s_3^* & s_2 & -s_1 \end{bmatrix} \begin{bmatrix} s_1 & s_2 & -s_3^* & s_4^* \\ s_2^* & -s_1^* & -s_4 & -s_3 \\ s_3 & s_4 & s_1^* & -s_2^* \\ s_4^* & -s_3^* & s_2 & s_1 \end{bmatrix}$$

where $s_1, s_2, s_3$ and $s_4$ represent four input symbols.

23. A method for transmitting modulation symbols in a wireless communication system, the method comprising steps of:

generating a transmission coding matrix with four rows corresponding to transmission time periods and three columns corresponding to three transmit antennas for achieving transmit diversity;

encoding a plurality of input symbols into a plurality of symbol combinations to transmit the input symbols once from each transmit antenna at each time period by using the transmission coding matrix;

outputting the symbol combinations to the each transmit antenna during the transmission time periods, the symbol combinations having orthogonal symbols, inversions and conjugates of the input symbols, and selectively rotating the phases of some of the symbols in the at least two columns of the transmission coding matrix by a predetermined phase value, wherein the transmission coding matrix is one of $$\begin{bmatrix} (s_1+s_2)/\sqrt{2} & s_3^* & s_4^* \\ (s_2^*-s_1^*)/\sqrt{2} & s_4 & -s_3 \\ (S_3+s_4)/\sqrt{2} & -s_1^* & -s_2^* \\ (s_4^*-s_3^*)/\sqrt{2} & -s_2 & s_1 \end{bmatrix} \begin{bmatrix} s_1(s_2+s_3^*)/\sqrt{2} & s_4^* \\ s_2^*(-s_1^*+s_4)/\sqrt{2} & -s_3 \\ s_3(s_4-s_1^*)/\sqrt{2} & -s_2^* \\ s_4^*(-s_3^*-s_2)/\sqrt{2} & s_1 \end{bmatrix} \begin{bmatrix} s_1 & s_3 & (s_3^*+s_4^*)/\sqrt{2} \\ s_2^* & -s_1^* & (s_4-s_3)/\sqrt{2} \\ s_3 & s_2 & (-s_1^*-s_2^*)/\sqrt{2} \\ s_4^* & -s_4^* & (s_1-s_2)/\sqrt{2} \end{bmatrix}$$

$$\begin{bmatrix} (s_1+s_3^*)/\sqrt{2} & s_2 & s_4^* \\ (s_2^*-s_4)/\sqrt{2} & -s_1^* & -s_3 \\ (s_3-s_1^*)/\sqrt{2} & s_4 & -s_2^* \\ (s_1^*-s_3)/\sqrt{2} & -s_3^* & s_1 \end{bmatrix} \begin{bmatrix} s_1 & (s_2+s_4^*)/\sqrt{2} & s_3^* \\ s_2^* & (-s_1^*-s_1)/\sqrt{2} & s_4 \\ s_3 & (s_2-s_2^*)/\sqrt{2} & -s_1^* \\ s_4^* & (-s_3^*+s_1)/\sqrt{2} & s_2 \end{bmatrix} \begin{bmatrix} s_2 & s_3 & (s_1+s_4^*)/\sqrt{2} \\ -s_1^* & s_4 & (s_2^*-s_3)/\sqrt{2} \\ s_4 & -s_1^* & (s_3-s_2^*)/\sqrt{2} \\ s_3^* & -s_3 & (s_4^*+s_1)/\sqrt{2} \end{bmatrix}$$

where $s_1, s_2, s_3$ and $s_4$ represent four input symbols.

* * * * *